(12) United States Patent
Obrien et al.

(10) Patent No.: US 8,128,246 B1
(45) Date of Patent: Mar. 6, 2012

(54) FAST STEERING MIRROR

(75) Inventors: Michael Joseph Obrien, Rochester, NY (US); William Bradley Smith, Honeoye Falls, NY (US)

(73) Assignee: Exelis, Inc., McLean, VA (US)

( * ) Notice: Subject to any disclaimer, the term of this patent is extended or adjusted under 35 U.S.C. 154(b) by 359 days.

(21) Appl. No.: 12/507,296

(22) Filed: Jul. 22, 2009

(51) Int. Cl.
*G02B 7/182* (2006.01)

(52) U.S. Cl. ........................................ 359/879

(58) Field of Classification Search .... 359/223.1–226.1, 359/200.7, 201.2, 202.1, 212.1–214.1
See application file for complete search history.

(56) References Cited

U.S. PATENT DOCUMENTS 7,643,196 B2 * 1/2010 Bernstein et al. .......... 359/224.1

* cited by examiner

*Primary Examiner* — Euncha Cherry
(74) *Attorney, Agent, or Firm* — RatnerPrestia

(57) ABSTRACT

An apparatus for tilting a mirror. The apparatus includes a plate for supporting the mirror and a diaphragm sandwiched between the mirror and the plate. The diaphragm includes cutout portions forming a pattern in the diaphragm. As the plate provides tilt motion to the mirror, the pattern in the diaphragm stabilizes the tilt motion of the mirror.

16 Claims, 26 Drawing Sheets

FAST STEERING MIRROR

FIELD OF THE INVENTION

This invention relates, generally, to a system for steering a mirror. More specifically, this invention relates to a system for fast steering a mirror, with the aid of a diaphragm having a cutout pattern to provide smooth linear motion for accurately controlling tilt of the mirror.

BACKGROUND OF THE INVENTION

In some mirror steering systems, non-linear motions may be encountered when tilting the mirror. The non-linear behavior is typically manifested because of a diaphragm which stretches as angular or linear deflection increases, thereby resulting in non-linear and inaccurate steering of the mirror.

Another limitation that affects conventional steering mirror systems is inaccurate sensing of the angular position of the mirror. Errors may arise in steering the mirror due to inaccurate sensing of angular position.

The present invention provides an improved mirror steering system. Furthermore, as described below, the invention provides a diaphragm having a cutout pattern positioned under the mirror, and a sensor used for calculating the angular position of the mirror.

SUMMARY OF THE INVENTION

To meet this and other needs, and in view of its purposes, the present invention provides an apparatus for tilting a mirror.

In one embodiment, the apparatus includes a mirror for reflecting light from an object, a plate for supporting the mirror, and a diaphragm sandwiched between the mirror and the plate. The diaphragm includes cutout portions forming a pattern in the diaphragm. Furthermore, the plate provides tilt motion to the mirror in which the pattern in the diaphragm stabilizes the tilt motion of the mirror.

The diaphragm includes a planar substrate having a center and a circumferential edge surrounding the center and the pattern also includes a plurality of first cutout portions. Each of the first cutout portions are defined by at least two first legs originating from a common location proximate to the center and extending toward the circumferential edge. The pattern also includes a plurality of second cutout portions. Each of the second cutout portions are defined by at least two second legs originating from a common location proximate to the circumferential edge and extending toward the center. In this embodiment, the plurality of first and second cutout portions are arranged symmetrically about the substrate.

In one embodiment, each of the first cutout portions includes three legs, and each of the second cutout portions includes two legs. Also, at least one first leg of each of the first cutout portions is disposed between at least two second legs of each of the second cutout portions. Furthermore, the first legs of the plurality of first cutout portions are interlaced with the second legs of the plurality of second cutout portions.

In an embodiment, the plate forms a top surface oriented in an X, Y plane of an orthogonal X, Y, Z coordinate system. The apparatus further includes a plurality of yokes extending from the plate downward in a Z direction of the X, Y, Z coordinate system. Each of the yokes receive a coil for forming a magnetic field. A plurality of pairs of magnets are each oriented to sandwich a respective coil. Each pair of magnets and a respective coil define a push/pull set where each push/pull set is arranged to push upward or downward in the Z direction on the plate.

In one embodiment, the plate is fixed in the Z direction at a central point and free to rotate in X and Y directions. Two first push/pull sets are arranged to rotate the plate in the X direction and two second push/pull sets are oriented orthogonally to the two first push/pull sets and arranged to rotate the plate in the Y direction.

The pattern in the diaphragm provides a nearly constant stiffness value (expressed in inch-pounds per degree) as a function of different tilt angles (expressed in degrees). The pattern in the diaphragm provides a first slope value obtained from stiffness values as a function of degrees that is smaller than a second slope value of a similar diaphragm without a cutout pattern.

In one embodiment, a plate forms an X, Y plane in an X, Y, Z coordinate system for providing angular motion to the mirror about X and Y axes. Four proximity sensors are oriented equidistant on a radius from a center point of the plate and sequentially positioned 90 degrees from one another. Each proximity sensor is located 45 degrees from the X or Y axis and separated from the plate by a gap in a Z direction. Each of the sensors provides a decreasing output voltage when a respective gap to the drive plate decreases, and also provides a constant output voltage when the respective gap to the drive plate increases. A circuit is also provided for receiving the output the output voltage from each of the sensors and determining the angular position of the mirror.

In one embodiment, the circuit includes: a first differential amplifier for receiving the output voltages from two proximity sensors positioned 180 degrees from each other and determining a first difference voltage, a second differential amplifier for receiving the output voltages from the other two proximity sensors and determining a second difference voltage, a third differential amplifier for receiving the first and second difference voltages and determining a third difference voltage, and a summing amplifier for receiving the first and second difference voltages and determining a summed voltage. The angular position of the mirror is determined by the third difference voltage and the summed voltage, respectively, which represent angular rotations about the Y axis and X axis.

A diaphragm is sandwiched between the mirror and the plate, the diaphragm includes cutout portions forming a pattern in the diaphragm. The pattern in the diaphragm linearizes the angular motion of the mirror and the pattern in the diaphragm is effective in moving the mirror independently about the X axis, and moving the mirror independently about the Y axis.

In one embodiment, the diaphragm includes a planar substrate fixed at the center point, and the pattern includes a plurality of cutout portions arranged symmetrically about the center point in a serpentine pattern. The pattern in the diaphragm provides a nearly constant stiffness value (expressed in inch-pounds per degree) as a function of angular change (expressed in degrees).

In one embodiment, a method is provided of controlling angular tilt of a mirror disposed on a planar plate when reflecting light from an object. The method includes the steps of: controlling angular tilt of the mirror by angularly tilting the planar plate, and stabilizing the angular tilt of the mirror by sandwiching a diaphragm having cutout portions between the mirror and the planar plate. The cutout portions smooth the angular tilt of the mirror.

A gap is provided between a plurality of proximity sensors and the planar plate. The method measures the amount of gap between each proximity sensor and the planar plate when angularly tilting the planar mirror, and determines the angular tilt of the mirror based on the measured gaps.

The method also centers the mirror, the plate and the diaphragm along a Z axis of an X, Y, Z coordinate system, and furthermore forms the cutout portions in the diaphragm in a serpentine pattern which is symmetrical about the Z axis.

Furthermore, the method controls of the angular tilt of the mirror by moving the plate in the Z direction using magnetic force upon peripheral locations of the plate, and measures the amount of gap between each proximity sensor and the planar plate by sensing inductive changes between the proximity sensor and the planar plate.

It is understood that the foregoing general description and the following detailed description are exemplary, but are not restrictive, of the invention.

DETAILED DESCRIPTION OF THE INVENTION

As will be described, the present invention provides a system for steering a mirror. The present invention includes a radial serpentine cutout pattern which reduces hoop and radial strain as the mirror is steered along two orthogonal axes. The present invention also includes sensors and circuitry for determining the position of the mirror in the two orthogonal axes.

Figure 1:
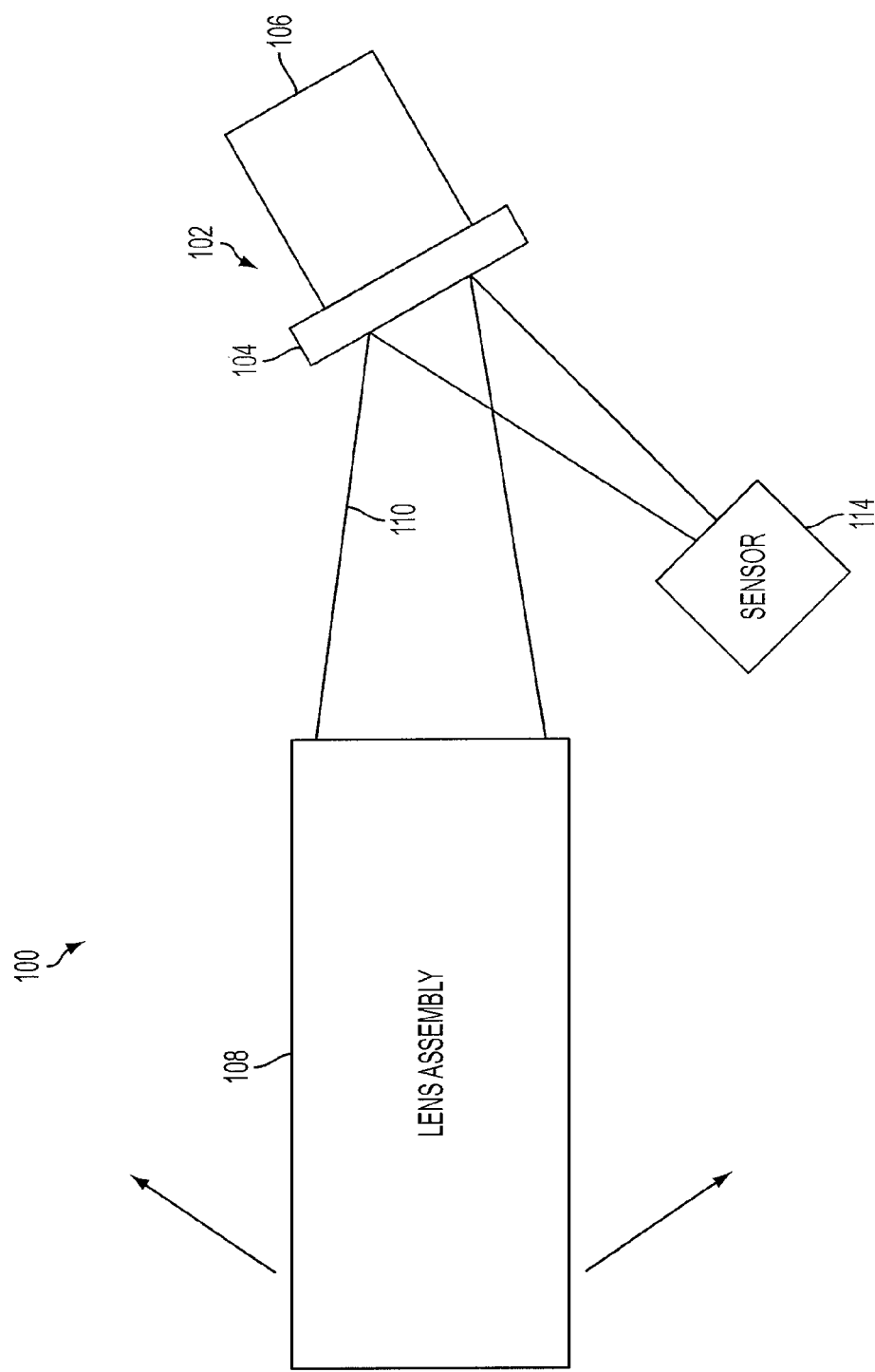
FIG. 1 is a block diagram of an image stabilization system utilizing a fast steering mirror.

Referring first to FIG. 1, there is shown an image stabilization system designated as 100, including fast steering mirror (FSM) 102, lens assembly 108 and sensor 114. The FSM 102 includes steering module 106 and mirror 104. In general, the FSM may compensate for motion in the lens assembly in order to maintain optical alignment with sensor 114. As light beam 110 exits lens assembly 108, the light beam is reflected by mirror 104 and received by sensor 114. As lens assembly 108 moves due to unwanted jitter, for example, mirror 104 may be rotated about two orthogonal axes in order to maintain optical alignment. Thus, mirror 104 may be steered by module 106 in order to tilt the mirror and remove jitter.

Figure 2:
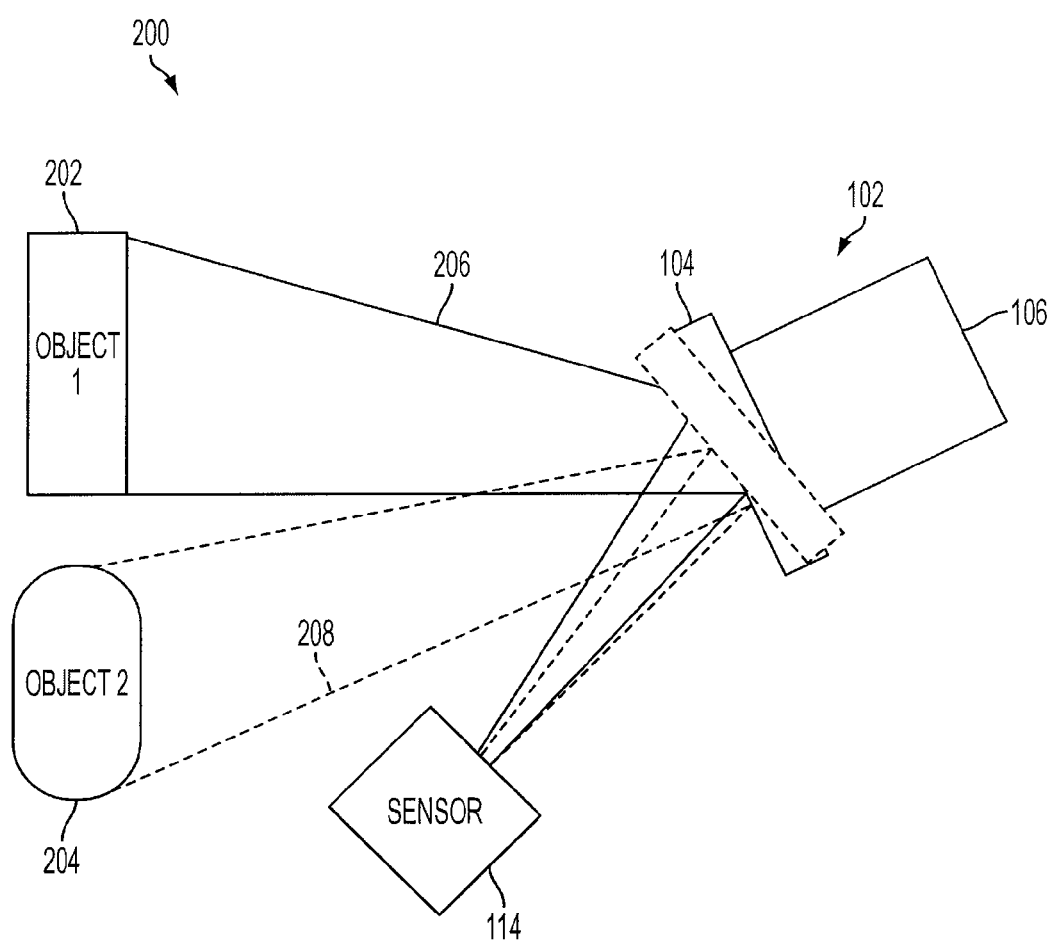
FIG. 2 is a block diagram of an image selection system utilizing a fast steering mirror.

In another embodiment, shown in FIG. 2, image selection system 200 includes FSM 102 and sensor 114 for imaging either object 202 or object 204 of a scene. As shown, the mirror reflects light from the objects onto sensor 114. When mirror 104 is tilted to a first position, the mirror reflects light beam 206 onto sensor 114. When mirror 104 is tilted to a second position, the mirror reflects light beam 208 onto sensor 114. Accordingly, FSM 102 steers mirror 104 to selectively reflect light from distinct objects onto sensor 114.

The following provides a description of FSM 102. Descriptions of sensing and computing the angular position of the mirror and steering the mirror are also provided.

Figure 3:
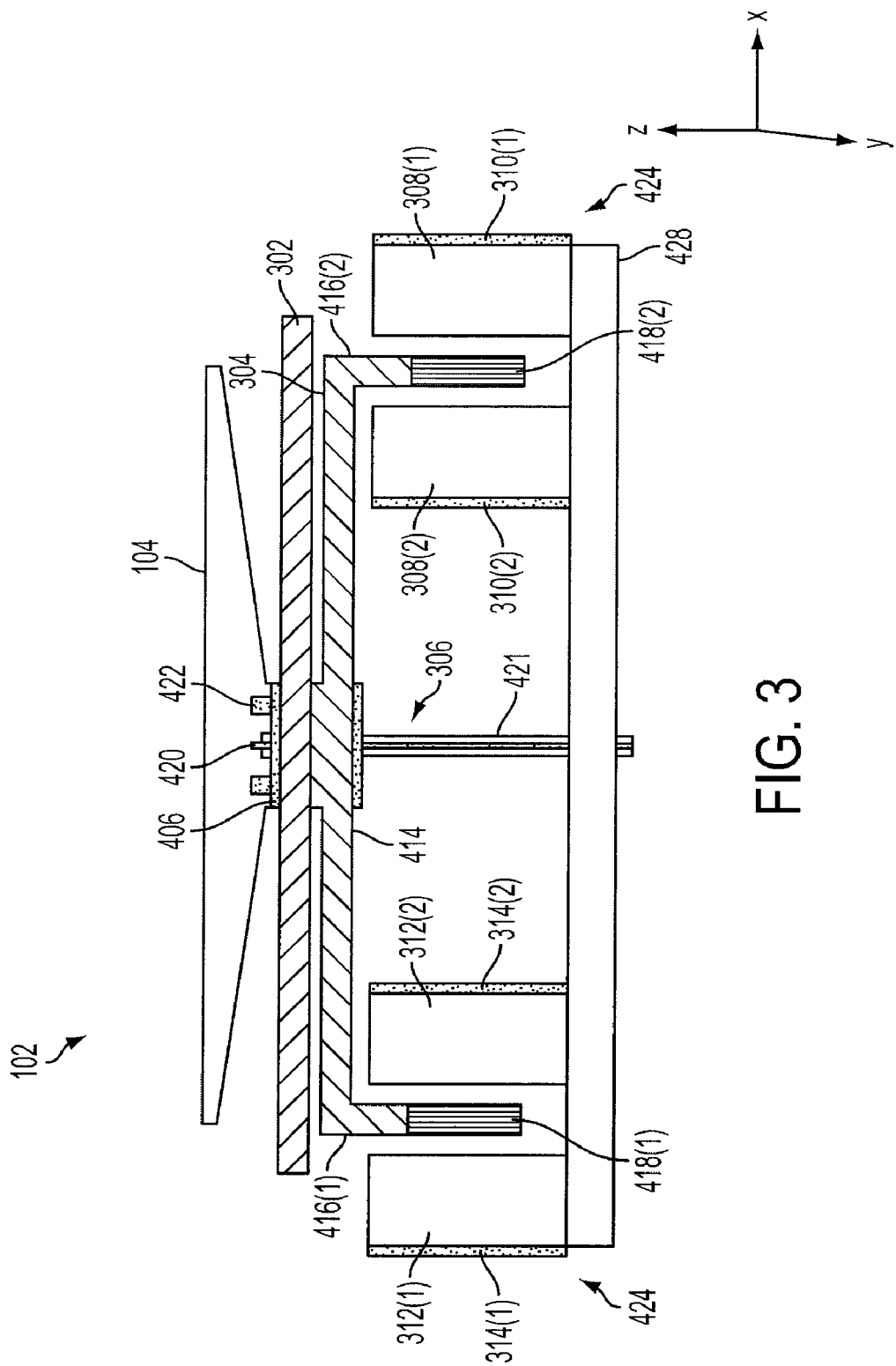
FIG. 3 is a simplified cross sectional view of the fast steering mirror shown in FIGS. 1 and 2.
Figure 4A:
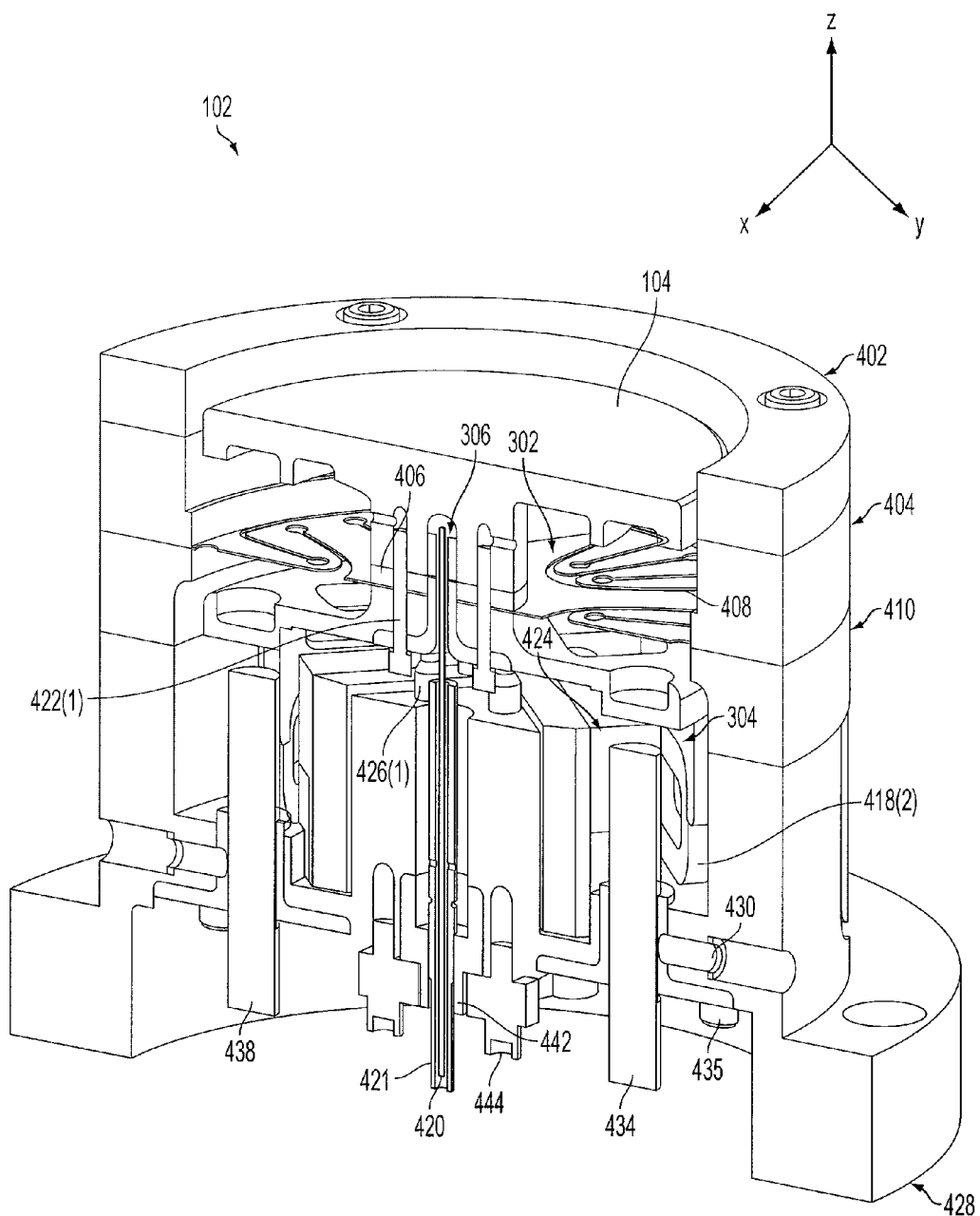
FIG. 4a is a cross sectional view of the fast steering mirror shown in FIGS. 1 and 2.
Figure 4B:
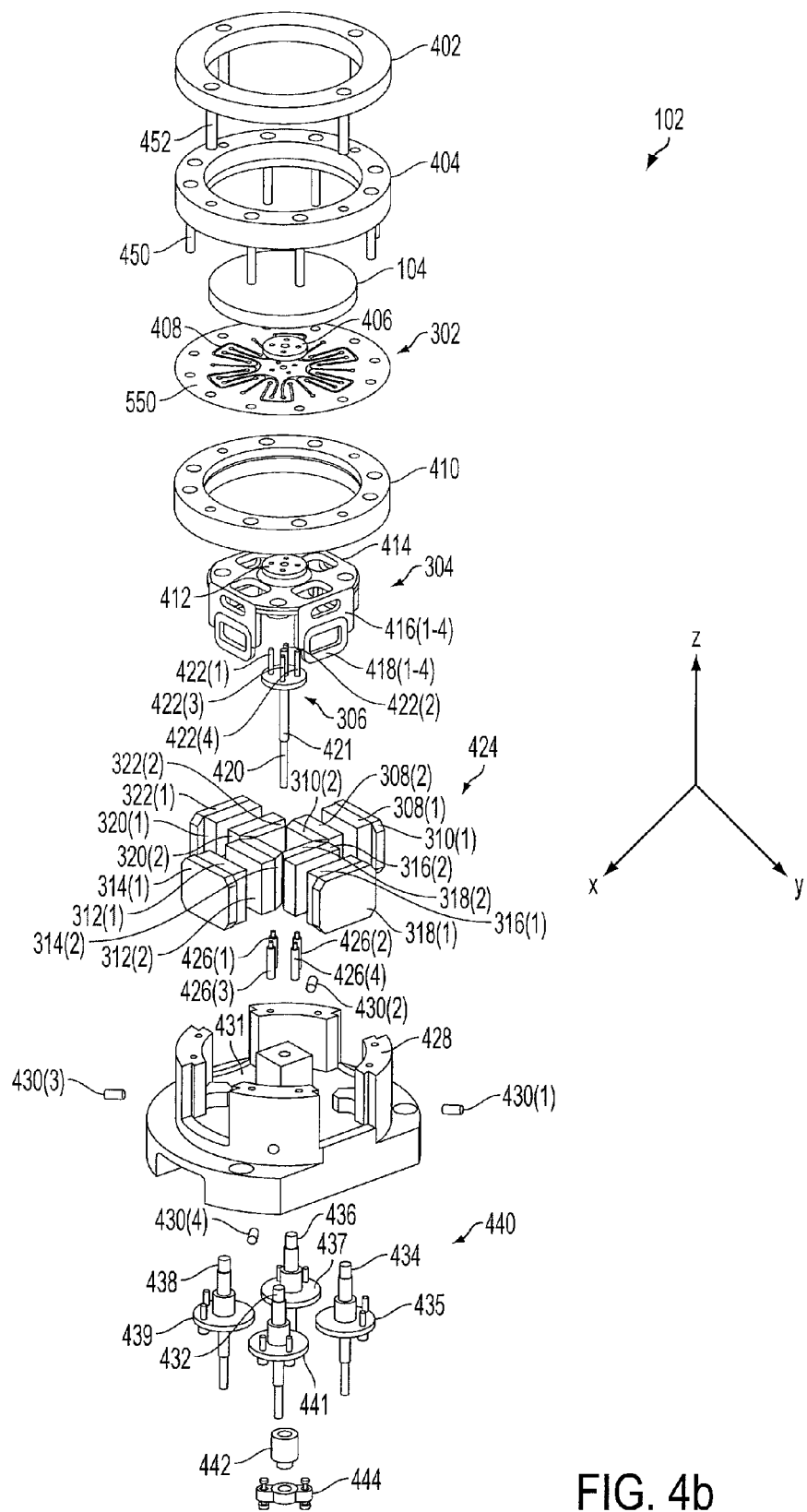
FIG. 4b is an exploded perspective view of the fast steering mirror shown in FIG. 3.

Referring now to FIGS. 3, 4a and 4b, there are shown a simplified cross sectional view of FSM 102, a detailed cross sectional view of FSM 102, and an exploded view of FSM 102 respectively. As shown, FSM 102 includes mirror 104, diaphragm 302, drive plate assembly 304, rod flexure assembly 306, magnet assembly 424 and base 428.

Drive plate assembly 304 includes a top rigid body 414 that extends in the X and Y directions. Drive plate assembly 304 also includes four yokes 416(1)-416(4), extending in the Z direction and perpendicular to top rigid body 414. The yokes, which are arranged 90 degrees apart from each other and include four respective coils 418(1)-418(4), are sandwiched between respective four pairs of magnets of magnet assembly 424. As best shown in FIG. 4b, the four pairs of magnets are designated as 308(1, 2), 312(1, 2), 316(1, 2) and 320(1, 2).

Flexible diaphragm 302, which is disposed above the top of rigid body 414, includes an outer circumference that is fixed between upper clamp ring 404 and lower clamp ring 410. The clamping is accomplished by inserting screws through holes 550 of flexible diaphragm 302. The diaphragm includes a radial serpentine pattern 408 formed from cutout portions in the material of diaphragm 302. The cutout portions allow the diaphragm to flex up or down in the Z axis independently with respect to the X and Y axes.

In general, diaphragm 302 and drive plate 304 are fastened together with screws 422 extending from rod flexure assembly 306 (shown in FIG. 4b). In addition, rod flexure assembly 306 includes central rod 420 encapsulated by an outer sheathing 421 which, at its upper end, extends through diaphragm 302 and into the lower surface of mirror 104. The lower end of central rod 420 passes through and extends in the Z axis below the bottom surface of base 428. Central rod 420 is fixed in position in the Z axis by end clamp 444 and coupling 442. In this manner, mirror 104 may be adjusted up or down in the Z axis and then fixed in a position relative to base 428. Furthermore, an axis of rotation of mirror 104 is defined by the central rod located in the center of base 428.

Magnet assembly 424 includes four pairs of magnets spaced 90 degrees with respect to each other. Two of the four pairs of magnets are shown in a cross-sectional view in FIG. 3, as magnet pair 312(1,2) and magnet pair 308(1,2). Each pair of magnets is bordered by a respective pair of flux plates, designated as 314(1,2) and 310(1,2) for directing the magnetic flux. In general, each pair of magnets of magnet assembly 424 sandwiches a respective coil 418(1)-418(4), as shown in FIG. 4b.

When current flows, for example, through coils 418(1) and 418(2), the magnetic fields of the respective coils interact with each pair of magnets in a push/pull manner, thereby tilting drive plate assembly 304. For example, if a positive current flows through coil 418(1) and a negative current flows through coil 418(2), coil 418(1) may be effective to pull down on the drive plate assembly in the Z axis and coil 418(2) may be effective to push up on the drive plate assembly in the Z axis. This push/pull behavior allows drive plate assembly 304 to rotate about the X and Y axes with respect to the center of rotation defined by rod flexure assembly 306.

When drive plate assembly 304 rotates about the X axis, mirror 104 which is fixed to the drive plate assembly by screws 422, also rotates about the X axis. This rotation flexes diaphragm 302 in the Z axis. The flexing of diaphragm 302 provides a smooth linear tilting movement because of the serpentine cutout portions in the diaphragm material.

Although the cross sectional view shown in FIG. 3 shows a capability to rotate the mirror about a single axis (X axis) it will be understood that magnet assembly 424 includes two other pairs of magnets 316(1,2) and 320(1,2), shown in FIG. 4b, that interact, respectively, with coils 418(3) and 418(4) to provide rotation about an orthogonal axis (Y axis not shown).

According to an embodiment of the invention, an exploded view of FSM 102 is shown in FIG. 4b. As shown, FSM 102 includes mirror protection ring 402, outer clamp ring 404, mirror 104, mirror spacer plate 406, diaphragm 302 with a radial serpentine cutout pattern 408, lower outer clamp ring 410, drive plate assembly 304 including top rigid body 414, mirror flexure mount plate 412, and coil yokes 416(1)-416(4) for holding coils 418(1)-418(4). Also shown is the rod flexure assembly including central rod 420, outer sheathing 421 and rod flexure screws 422(1)-422(4). Furthermore, magnet assembly 424 includes magnet pair 308 (1,2), magnet pair 312(1,2), magnet pair 316(1,2) and magnet pair 320(1,2); corresponding flux plate pairs, namely flux plate pair 310(1, 2), flux plate pair 314 (1,2), flux plate pair 418(1,2) and flux plate pair 322(1,2). Further still, FSM 102 includes base 428, which includes snubbers 426(1)-426(4), sensor set screws 430(1)-430(4), sensor clamp plates 435, 437, 439 and 441, sensors 432, 434, 436 and 438, rod flexure end coupling 442 and end coupling clamp 444.

Sensor clamp plates 435, 437, 439 and 441 are mounted to the bottom surface of base 428 by screws. Sensors 432, 434, 436 and 438 are inserted in the center holes of respective sensor clamp plates. These four sensors are then fixed in a position in the Z axis by set screws 430(1)-430(4). The set screws screw into the outer surface of base 428 and extend from the inner surface of base 428 towards its center. Each set screw 430(1)-430(4) comes into contact with a respective sensor. In general, the four sensors are positioned to extend upwards in the Z axis from the base to position the sensors in close proximity to rigid body 414 of the drive plate assembly. Also, the four sensors are positioned at 45 degree angles with respect to both the X and Y axes.

Magnet assembly 424 as shown in FIG. 4b is inserted into the top opening of base 428, so that the four pairs of magnets and four pairs of flux plates rest on top of shelf 431 and are spaced within the four orthogonal quadrants of base 428. The two magnets within each of the four pairs of magnets is separated by a gap in order to receive a corresponding coil, as described above.

Snubbers 426(1)-426(4) are inserted into the center holes of base 428 in order to provide a fixed stopping position for drive plate assembly 304. In general, the maximum tilt of the mirror is limited by the drive plate assembly butting against the four snubbers which extend upward in the Z axis from the center portion of base 428. The maximum tilt attainable by the mirror is adjusted by adjusting the height in which the snubbers extend upward in the Z axis.

Rod flexure assembly 306 is mounted in the center portion of base 428 above snubbers 426(1)-426(4). The central rod 420 encapsulated in sheathing 421 is inserted in a center hole of base 428 so that it protrudes below the bottom surface of base 428. The portion of sheathing 421 which protrudes below the base may be used to clamp the rod flexure assembly to the base by end coupling 442 and end clamp 444.

The four screws 422(1)-422(4) of central rod assembly 306 protrude upward in the Z axis from the center mount of base 428 in order to couple together drive plate assembly 304, diaphragm 302, mirror spacer plate 406 and mirror 104. Central rod 420 and screws 422(1)-422(4) are inserted through the holes of mirror/flexure mounting plate 412, diaphragm 302 and mirror spacer plate 406. Rod flexure screws 422(1)-422(4) and the top portion of central rod 420 terminate inside the bottom portion of mirror 104 (shown in FIG. 4a). Specifically, the four screws mate with female threads in the bottom portion of mirror 104, and the central rod 420 mates with a cavity in the bottom portion of mirror 104.

Diaphragm 302, as shown in FIG. 4b, includes outer mounting holes 550 surrounding the outer circumference of the diaphragm. Outer mounting holes 550 of diaphragm 302 are aligned with the holes in lower outer clamp ring 410 and upper outer clamp ring 404. Screws 450 pass through the outer holes in ring 404, diaphragm 302 and ring 410. Screws 450 are then screwed into female threads of the four quadrants of base 428. Furthermore, mirror protection ring 402 is mounted on upper outer clamp ring 404 for protecting the mirror. Mirror protection ring 402 is mounted with screws 452 being screwed into corresponding female threads in upper outer clamp ring 404.

In operation, as drive plate 304 rotates about the X and Y axes, diaphragm 302 is flexed in the Z axis. The flexing characteristics of the diaphragm affects the overall tilt of the mirror. In one embodiment of the invention, diaphragm 302 has a cutout portion, referred to herein as a radial serpentine pattern, shown as serpentine pattern 500 in FIG. 5a. Radial serpentine pattern 500 includes six three-legged inner cutouts 514, 516, 518, 520, 522 and 524, and six two-legged outer cutouts 502, 504, 506, 508, 510 and 512. The inner cutouts extend from a common location and branch toward the outer circumference of diaphragm 302. The outer cutouts extend from a common location and branch toward the center of diaphragm 302. The three-legged inner cutouts and two-legged inner cutouts in this embodiment are interlaced with each other.

By forming serpentine pattern 500 in diaphragm 302, tilting of the mirror about one axis becomes independent of tilting the mirror in another axis. For example, rotation about the X axis has little or no affect on rotation about the Y axis. This independence is achieved because hoop and radial strains are reduced by serpentine cutout pattern 500. In operation, as drive plate assembly 304 rotates about the X and Y axes, mirror 104 presses against and flexes on diaphragm 304 which provides a smooth linear tilting motion.

Figure 5A:
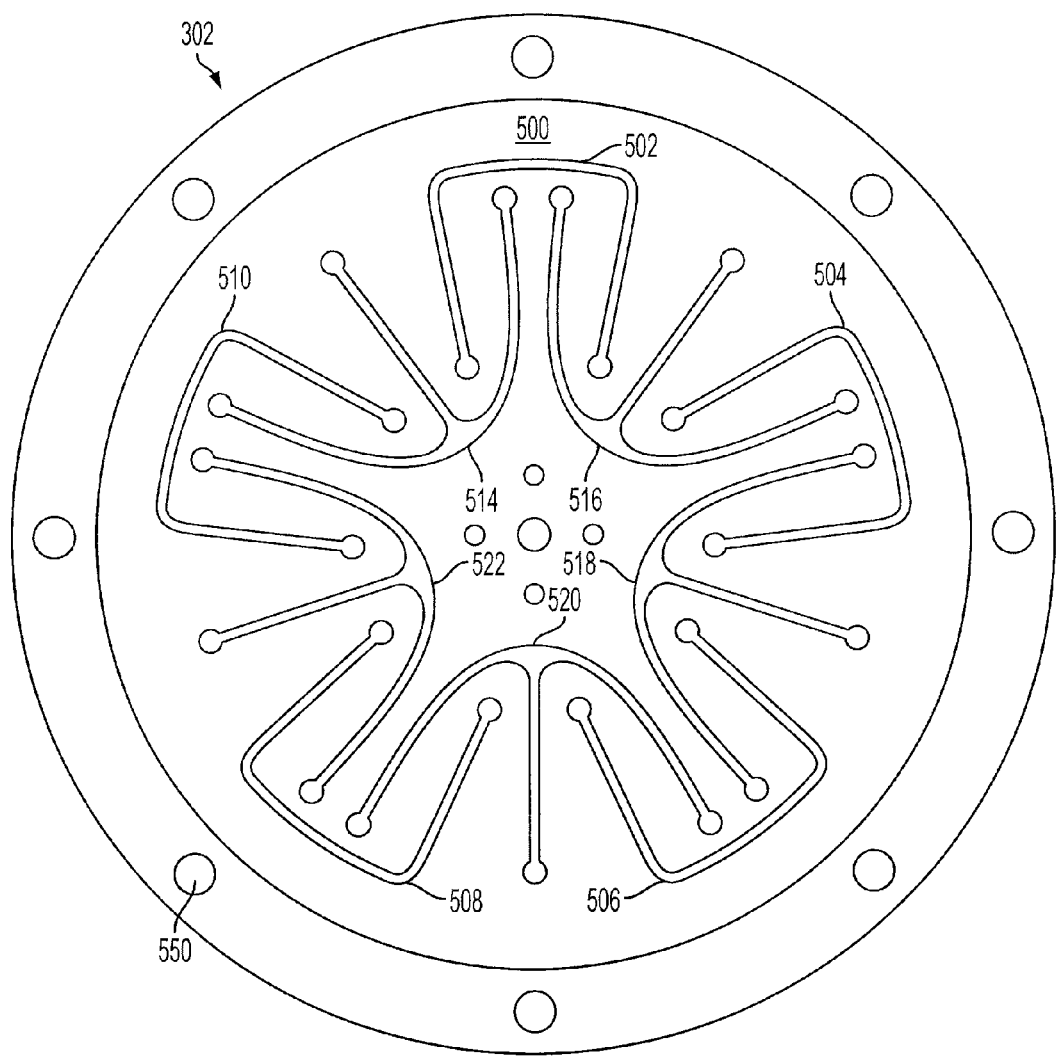
FIG. 5a is a top perspective view of a diaphragm with a radial pattern cutout having five cutout portions.
Figure 5B:
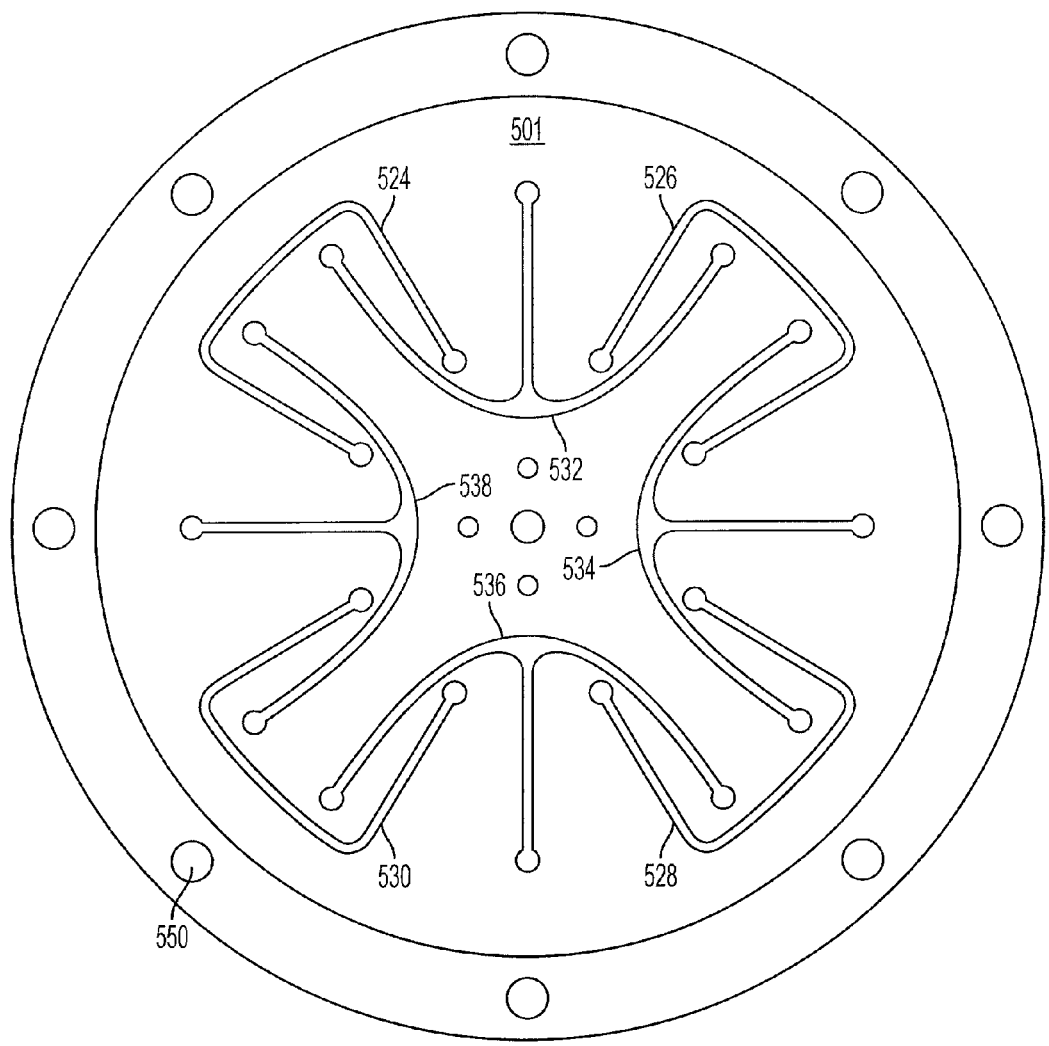
FIG. 5b is a top perspective view of a diaphragm with a radial pattern cutout having four cutout portions.
Figure 5C:
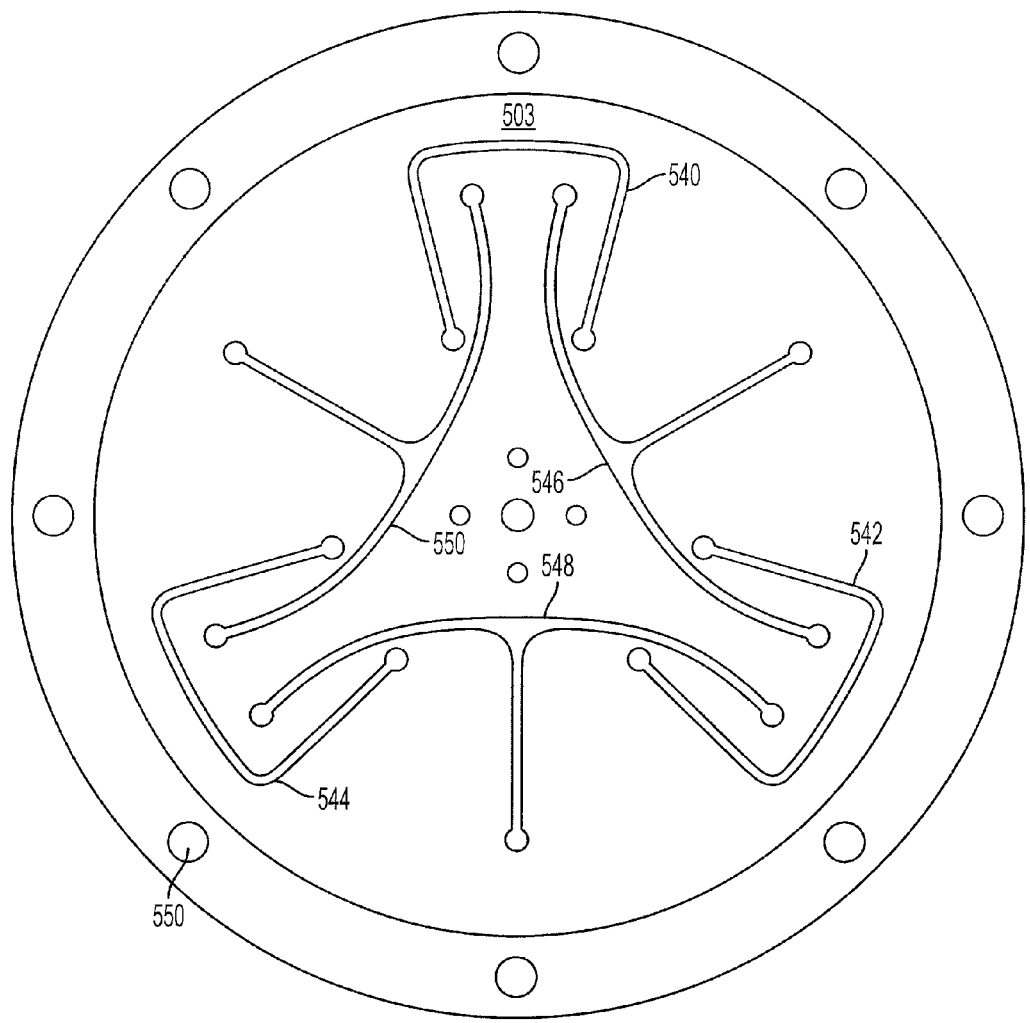
FIG. 5c is a top perspective view of a diaphragm with a radial pattern cutout having three cutout portions.

The radial serpentine pattern used by the diaphragm of the present invention may be different from that shown in FIG. 5a. For example, FIGS. 5b and 5c show radial serpentine patterns having four and three inner/outer cutouts respectively. In FIG. 5b, serpentine pattern 501 includes four outer cutouts extending towards the center of diaphragm 302 and four inner cutouts extending towards the outer circumference of diaphragm 302. Similarly, in FIG. 5c, serpentine pattern 503 includes three outer cutouts extending towards the center of diaphragm 302 and three inner cutouts extending towards the outer circumference of diaphragm 302. The inner and outer cutouts may be swapped in other embodiments. For example, the legs of inner cutouts 540, 542 and 544 in FIG. 5c may extend towards the outer circumference of diaphragm 302, while the legs of outer cutouts 546, 548 and 550 may extend towards the center of diaphragm 302. In other embodiments, the serpentine pattern cutout may include various numbers of inner/outer cutouts having various numbers of legs. The inner/outer cutouts may also be positioned at various angles with respect to the X and Y axes.

The serpentine pattern cutouts in FIGS. 5a-5c alter the rotational stiffness properties of diaphragm 302. One benefit to the serpentine pattern cutout is constant stiffness over the range of rotation. By providing constant stiffness at varying angles of rotation, the rate of power consumed by coils 418(1)-418(4) to rotate drive plate assembly 304 also remains constant over the range of rotation. The radial serpentine pattern cutout also decreases the overall stress which allows the diaphragm thickness to be increased for tuning modes of vibration (modes of vibration are constant thought the range of travel). Furthermore, the radial serpentine pattern cutout allows the overall FSM system to benefit from low hysteresis and low sensitivity to assembly errors such as out of plane flatness.

Figure 5D:
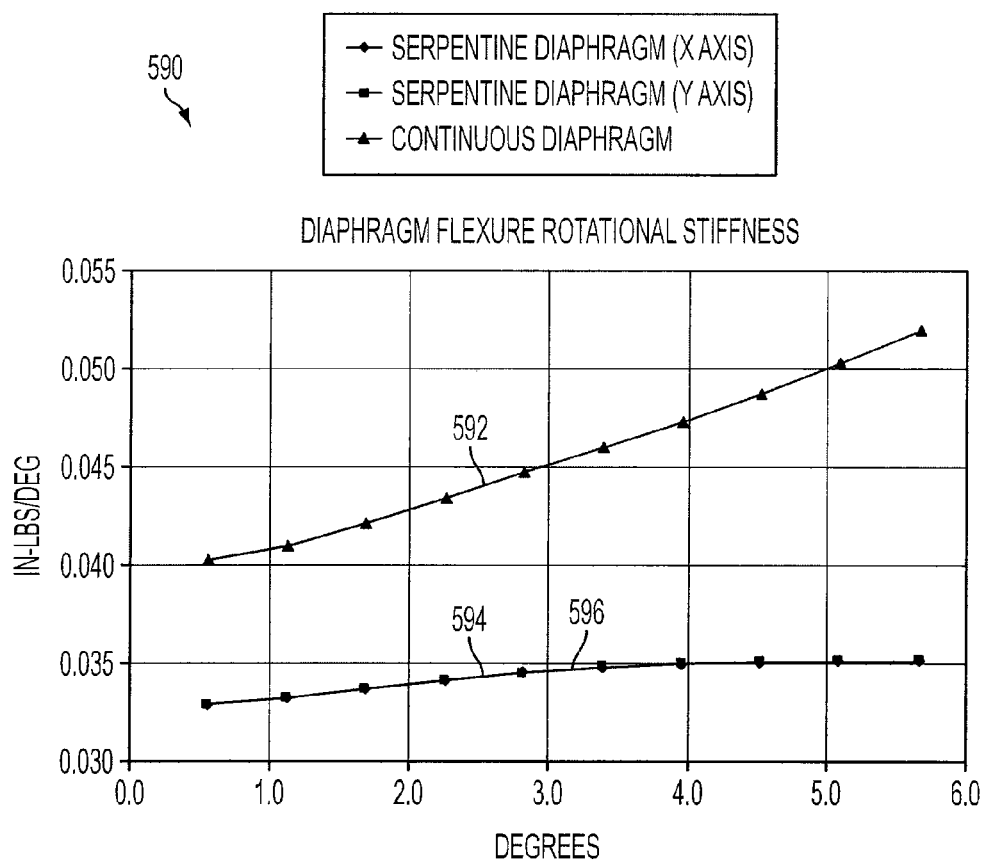
FIG. 5d shows plots of rotational stiffness of a diaphragm with a radial pattern cutout and a diaphragm without a radial pattern cutout.

FIG. 5d shows two data plots for comparing the rotational stiffness between two distinct diaphragms. Specifically, one of the diaphragms (diaphragm in FIG. 5a) has a serpentine pattern cutout and the other diaphragm does not have a radial serpentine pattern cutout. Curves 594 and 596 (rotational stiffness of X and Y axis respectively) show that the diaphragm having the radial serpentine cutout has a slight increase in rotational stiffness from roughly 0.033 in-lbs/deg at 0.05 degrees of rotation to roughly 0.035 in-lbs/deg at 4 degrees of rotation. At rotations greater than 4 degrees, the rotational stiffness of the diaphragm does not significantly increase (rotational stiffness remains constant at 0.035). Also, curves 594 and 596 for both the X and Y axis, exhibit substantially similar stiffness over the entire range of rotation due to the overall symmetry of the radial serpentine pattern cutout.

In contrast, curve 592 shows that the continuous diaphragm without the radial serpentine pattern cutout has a steady increase in rotational stiffness from roughly 0.04 in-lbs/deg at 0.05 degrees of rotation to roughly 0.052 in-lbs/deg at 5.5 degrees of rotation. Therefore, the continuous diaphragm without the radial serpentine pattern cutout does not provide a constant stiffness over the range of rotation.

FIGS. 6-11 are now described to show the positional relationship and interaction between the various components of the FSM system.

Figure 6:
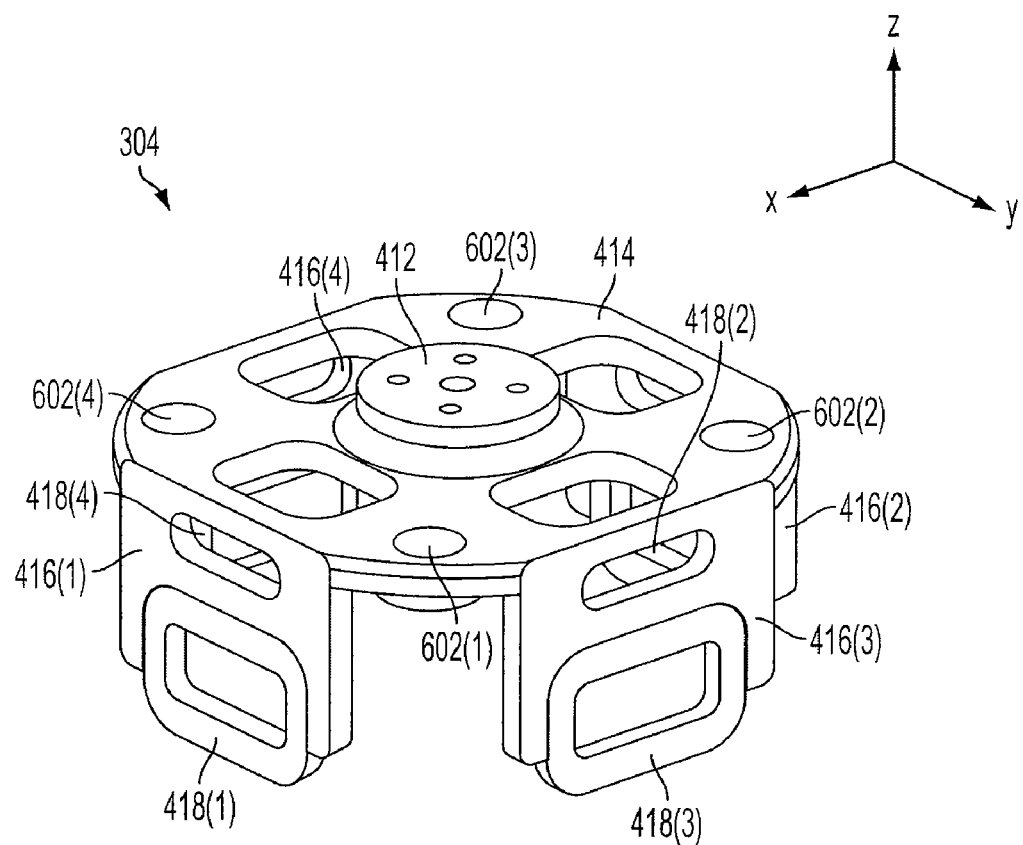
FIG. 6 is perspective view of the drive plate assembly shown in FIG. 4b.

As shown in FIG. 6, four drive coils 418(1)-418(4) are mounted in four drive yokes 416(1)-416(4) at 90 degree increments around drive plate assembly 304. Targets 602(1)-601(4) of rigid body 414 are located at 45 degree angles with respect to the X and Y axes. It will be later described that the four targets 602(1)-602(4) are aligned with the proximity sensors which act as detection targets for the four sensors. Flexure plate 412 in the center of rigid body 414 includes four screw holes and a center hole for receiving screws 422(1)-422(4), sheathing 421 and rod 420. Screws 422(1)-422(4) and rod 420 are passed through the bottom surface of 412 and extend from the top surface of 412 in the Z axis (shown in FIG. 4a).

Figure 7:
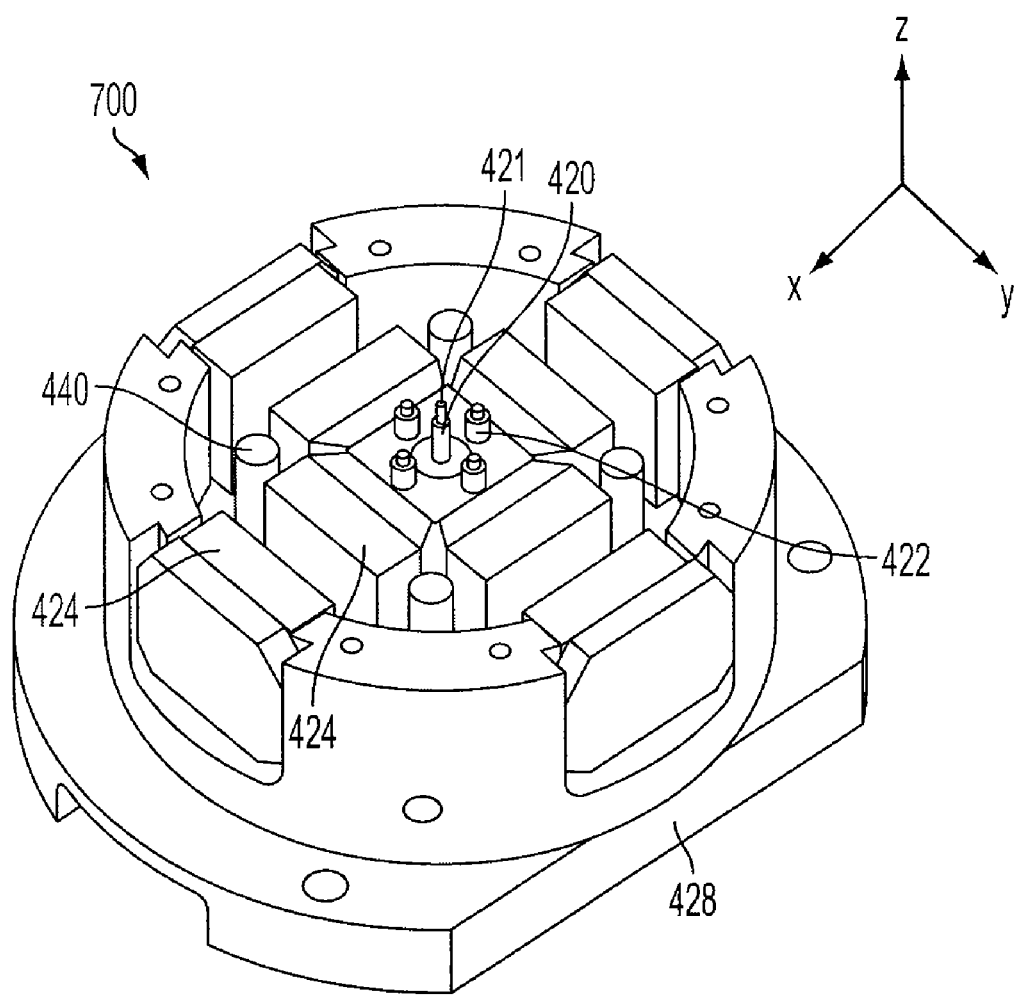
FIG. 7 is a perspective view of a magnet assembly and rod flexure assembly shown in FIG. 4b.

System 700 of FIG. 7 shows FSM 102 partially assembled. In system 700, and as previously described in FIG. 4b, magnet assembly 424, sensors 440 and rod flexure assembly 302 are mounted in base 428. Sensors 440 are mounted at 45 degree angles with respect to both the X and Y axes. Central rod 420 and screws 422(1)-422(4) extend from the center of base 428 in the Z axis and pass through the holes of flexure plate 412, diaphragm 302 and mirror spacer plate 406 (shown in FIG. 4a). As previously described, the magnets within each pair of magnets in system 700 is separated by respective gaps in which coils 418(1)-418(4) suspended from yokes 416(1)-416(4) are received.

Figure 8:
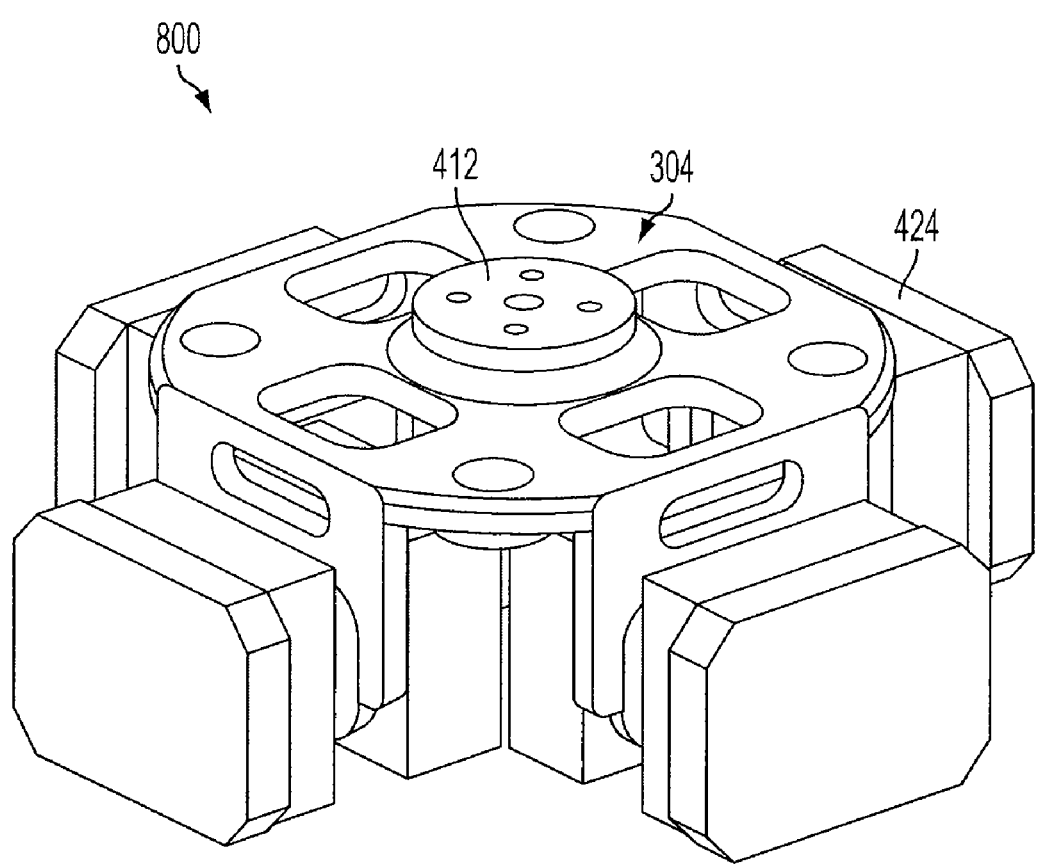
FIG. 8 is a perspective view of the drive plate assembly and the magnet assembly shown in FIG. 4b.

One example of the positional relationship between drive plate assembly 304 and magnetic assembly 424 is shown as system 800 in FIG. 8. Drive plate assembly 304 is mounted to the center of base 428 by passing screws 422(1)-422(4) and central rod 421 through the holes of flexure plate 412. In this configuration, coils 418(1)-418(4) are freely suspended in the four gaps sandwiched between magnet pairs 308(1,2), 312(1, 2), 316(1,2) and 320(1,2).

The magnets of magnet assembly 424 generate a magnetic field adequate to accommodate the gap required to receive coils 418 of drive plate assembly 304. The gap between the magnets is large enough to provide room for the drive plate assembly to rotate freely in both the X and Y axes. Coils 418(1)-418(4) are vertically centered between the magnet pairs when the drive plate assembly is in the home position (not rotated). As the drive plate assembly rotates, each coil may then assume varying distances with respect to each magnet pair (the coils are no longer vertically centered).

Figure 9:
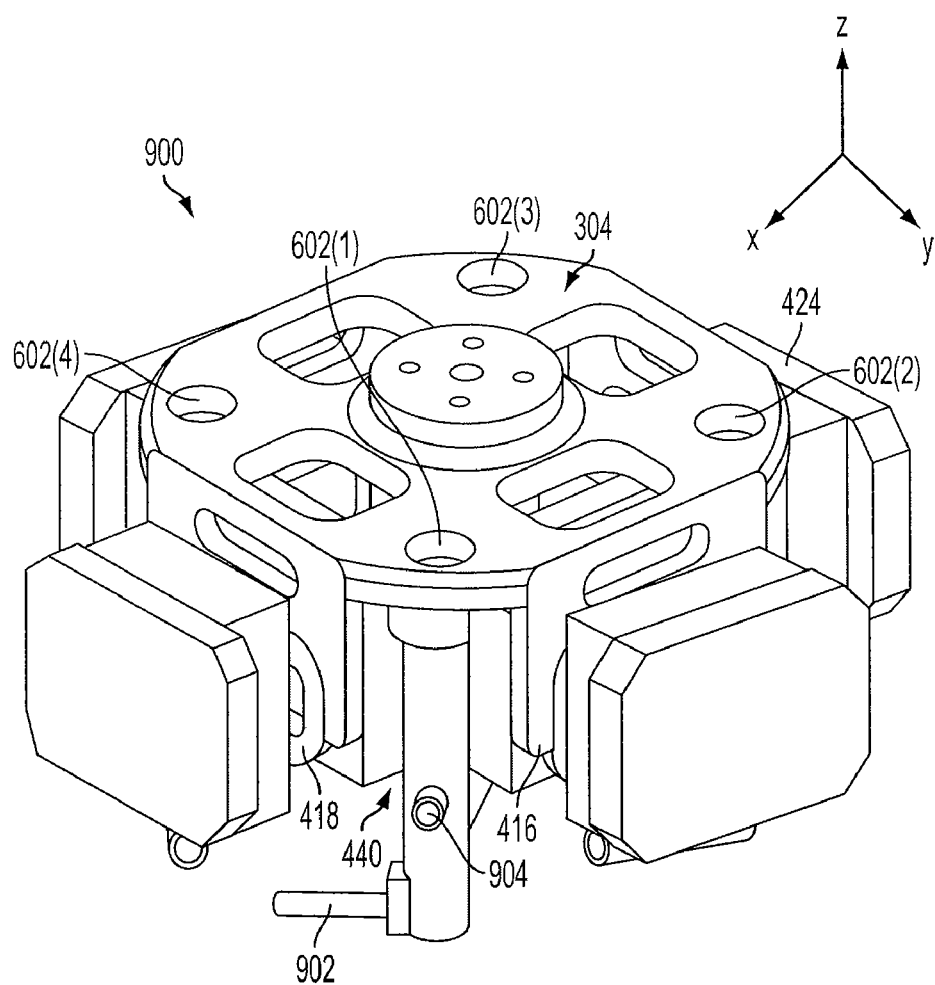
FIG. 9 is a perspective view of the drive plate assembly and the magnet assembly shown in FIG. 4b including proximity sensors.

System 900 of FIG. 9 shows system 800 with the addition of proximity sensors 440. Sensors 432, 434, 436 and 438 are aligned in the X and Y axis with sensor targets 602(1)-602(4) respectively. Each of the four sensors inductively determine their respective distances to the respective sensor targets. In general, the distance from the sensors to the respective sensor targets increases and decreases as drive plate 304 rotates about the X and Y axes.

Sensors 432, 434, 436 and 438 include ports 902 and 904 connected to internal magnetically coupled coils. Each of the sensors is powered by electrical current through one port and outputs an electrical signal through the other port. The electrical signal output from each sensor is proportional to the proximity of the sensor to the respective sensor target. The electrical signal output is then input to a detection circuit (shown in FIG. 17) to determine the X and Y position of mirror 104.

Figure 10:
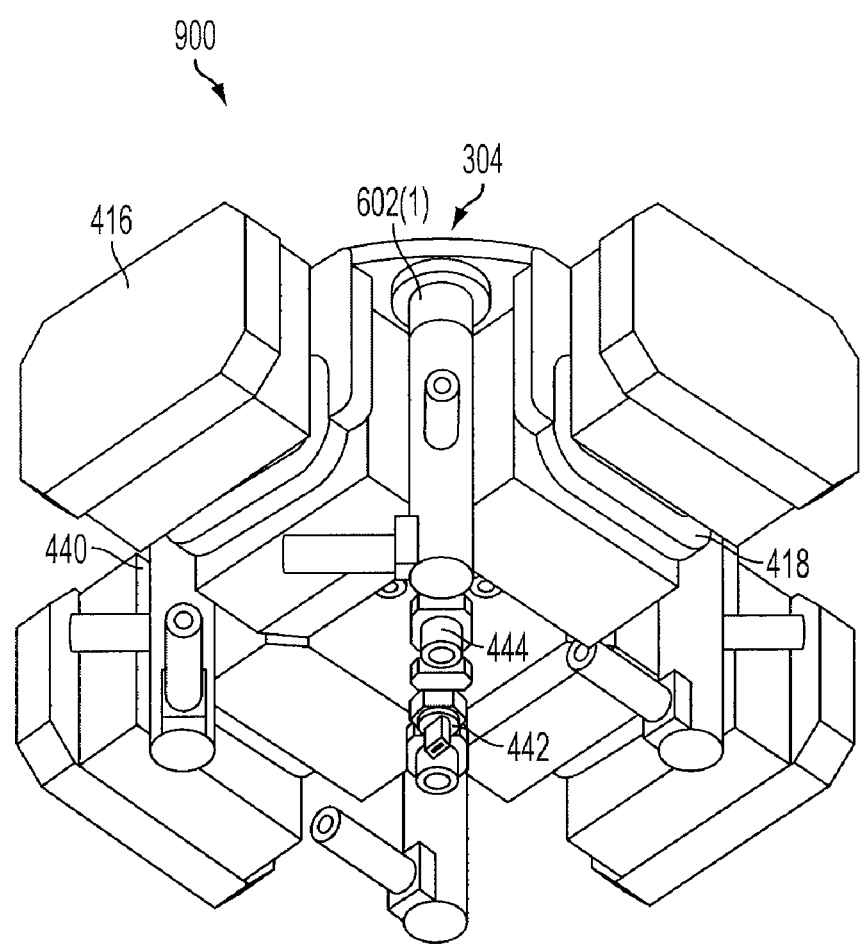
FIG. 10 is a bottom perspective view of components shown in FIG. 9 including a rod flexure coupling and a rod flexure clamp.

Rod flexure end coupling 442 and end coupling clamp 444 are shown in FIG. 10 which is a bottom view of system 900 in FIG. 9. In FIG. 10, rod flexure end coupling 442 is coupled to the bottom of sheathing 421 which is exposed below the bottom surface of base 428. End coupling clamp 444 fixes end coupling 442 once a position for sheathing 421 is acquired. This configuration allows central rod 420 to be vertically adjusted in the Z axis and clamped in position. The vertical position of central rod 420 may be adjusted up or down depending on the overall configuration FSM 102. For example, the position of rod 420 may be adjusted to accommodate the vertical axis requirements of mirror 104 in various optical systems.

Figure 11:
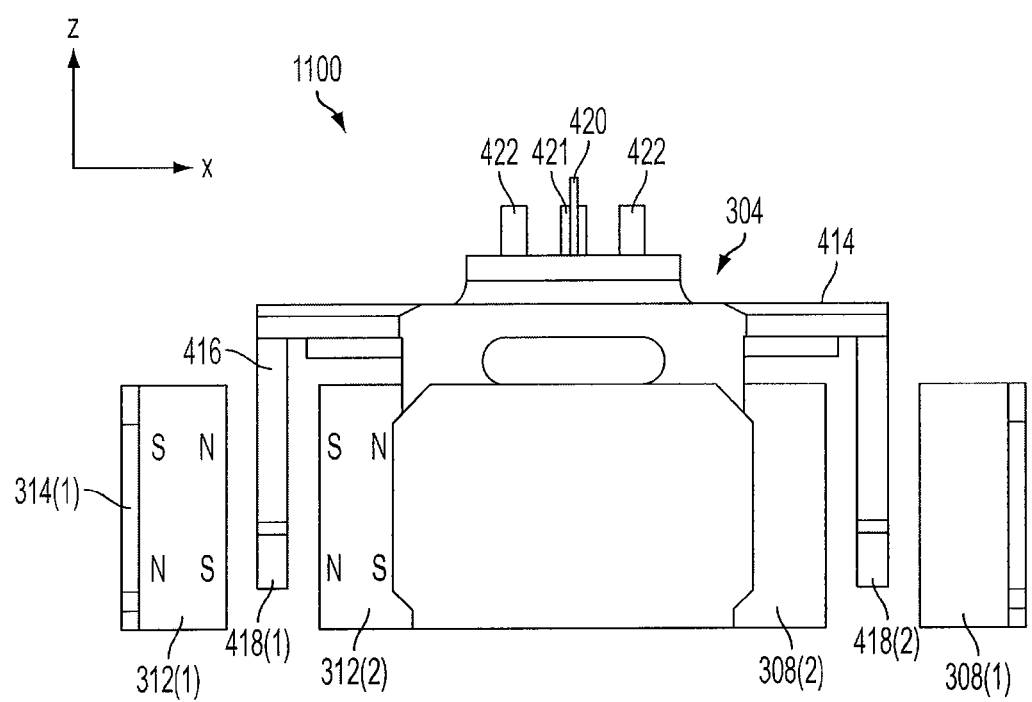
FIG. 11 is a cross sectional side view depicting positional relationships between the drive plate assembly and the magnet assembly shown in FIG. 4b.

Similar to FIG. 3, FIG. 11 shows a side cross sectional view of the positional relationship between coils 418(1), 418(2) and the pairs of magnets 308(1,2) and 312(1,2). Each of the pairs of magnets include two permanent magnets having a range such that a uniform high intensity field is formed in the gap. Minimum flux and maximum gap flux are obtained by arranging the magnet pairs with opposite polarity across each respective gap. As previously described, depending on the amplitude and polarity of the current flowing through coils 418(1) and 418(2), rigid body 414 may be pulled up or pushed down in the Z axis due to the opposing north and south polarities of permanent magnet pairs 312(1,2) and 308(1,2).

In general, coils 418(1)-418(4) are driven by an electrical current which induces a magnetic field around each respective coil. The magnetic field produced by each coil magnetically interacts with the stationary magnetic field of the permanent magnet pairs which sit perpendicular to the coil surface. This magnetic interaction generates a force in the Z axis which may either be an upward or downward force depending on the direction of current flow. In this embodiment, opposite coils (coils that are 180° from each other) are supplied with currents of opposite polarity to induce a push/pull behavior. For example, if a positive current flows through coil 418(1), a negative current will flow through coil 418(2). These opposing currents produce opposite magnetic fields which interact in an opposite manner with respective permanent magnet pairs. For example, the positive current flowing through coil 418(1) may result in an upward force being applied to one side of rigid body 414, while the negative current flowing through coil 418(2) may result in a downward force being applied to the opposite side of rigid body 414.

Central rod 420 which defines the center of rotation for drive plate assembly 304, is inserted into the bottom of mirror 104 which limits the movement of mirror 104 in the Z direction. If the mirror pushes down on central rod 420 in the Z axis, then central rod 420 will bend slightly. Since rod 420 is encapsulated by outer sheathing 421 (shown in FIG. 4a), however, the maximum amount of bend is limited. For example, as rod 420 bends, a portion of rod 420 will abut the outer sheathing 421 which thereby restricts the maximum distance the rod may bend. By restricting the bending of central rod 420, the movement of mirror 104 in the Z axis is also restricted.

Figure 12:
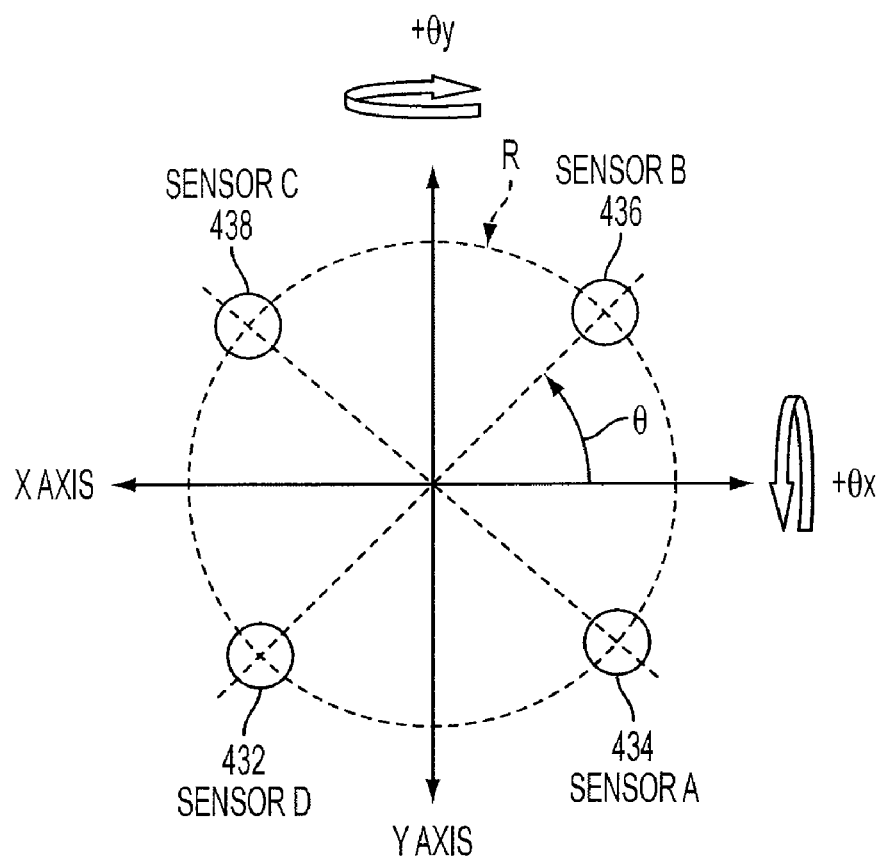
FIG. 12 is a diagram depicting angular positions of sensors A-D with respect to two axes of rotation.

As previously described, angular positioning about both the X and Y axes is measured by proximity sensors 440. A top view of the positioning of the proximity sensors relative to the X and Y axes is shown in FIG. 12. As described, the gaps between the four sensors and the four respective sensor targets increase or decrease as the drive plate assembly rotates about the X and Y axes. In the embodiment shown in FIG. 12, the gap between sensor target 602(2) and sensor A (sensor 434) and the gap between sensor target 602(1) and sensor D (sensor 432) both decrease equally with a positive angular rotation about the X axis. Similarly, the gap between sensor target 602(4) and sensor C (sensor 438) and the gap between sensor target 602(1) and sensor D (sensor 432) both decrease equally with a positive angular rotation about the Y axis.

In this embodiment, sensors A-D are positioned at 45 degree angles with respect to the X and Y axes, and at a constant radius to the axis of rotation (origin of the axes). This positioning provides equal sensitivity to detecting rotations about the X and Y axes. The 45 degree positioning also allows electronic decoupling of the X and Y axis even though the sensors are not directly aligned with either axis. Other angular positions for the sensors relative to the X and Y axes may be alternatively chosen. These alternative positions, however, should be mathematically decoupled to provide pure X and Y rotations.

Relative output voltages from each sensor for pure X and Y rotations are illustrated in FIGS. 13a-13d. In one embodiment, sensors (A-D) are configured such that the output voltage is maximum in the home position ($\theta x = \theta y = 0$) and then decreases from the maximum voltage as the gap between the sensors and the drive plate targets is reduced. As the gap increases, no change in output voltage occurs (voltage stays at the maximum value).

Figure 13A:
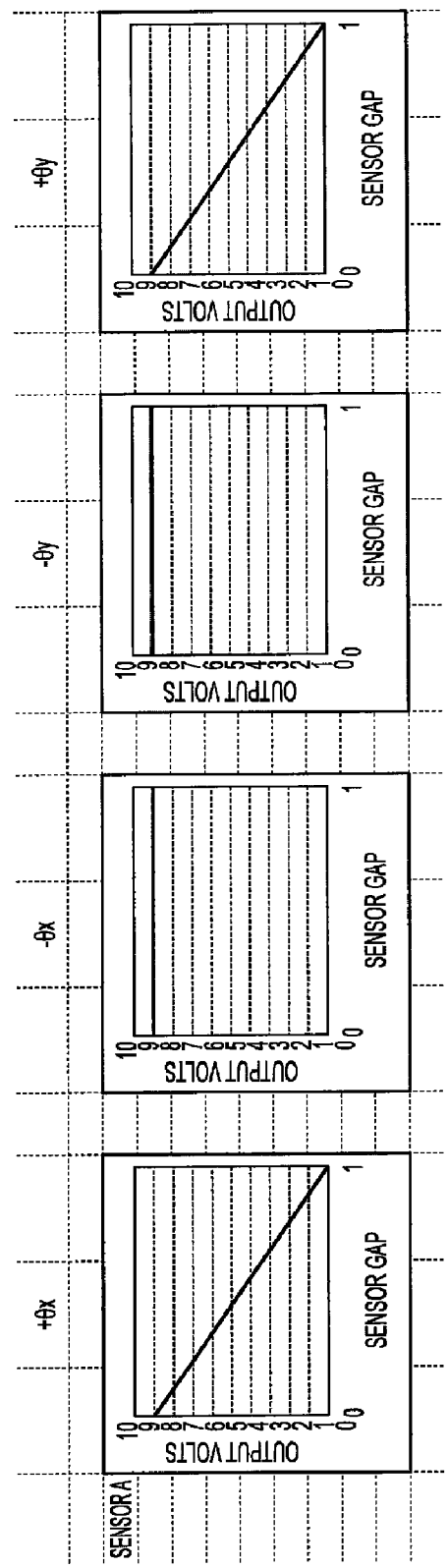
FIG. 13a depicts four plots of output voltages of sensor A resulting from angular rotation about the X and Y axes.
Figure 13B:
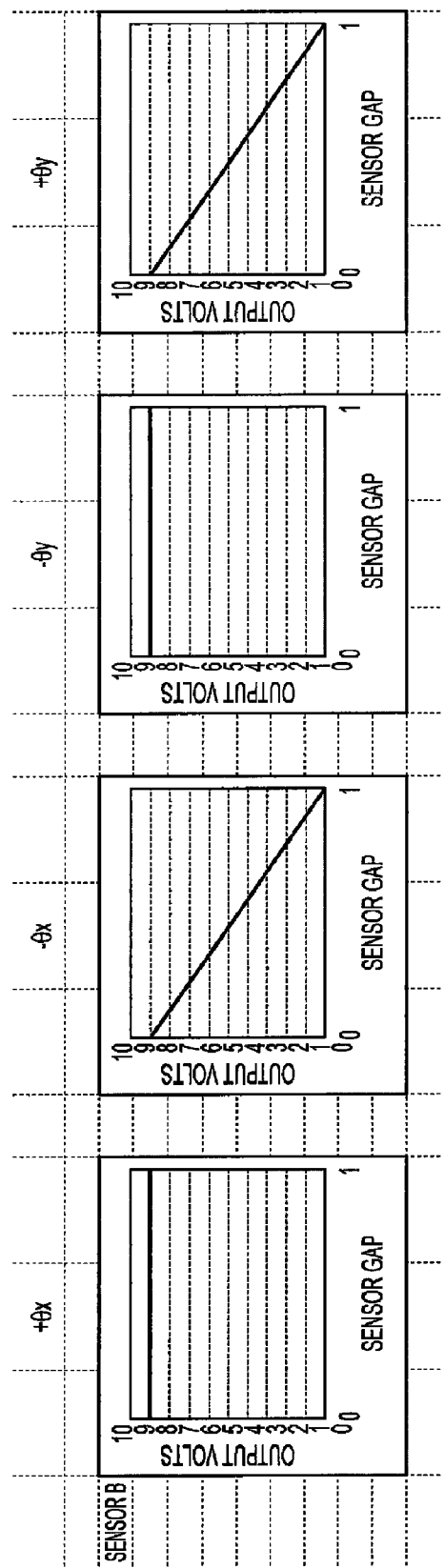
FIG. 13b depicts four plots of output voltages of sensor B resulting from angular rotation about the X and Y axes.
Figure 13C:
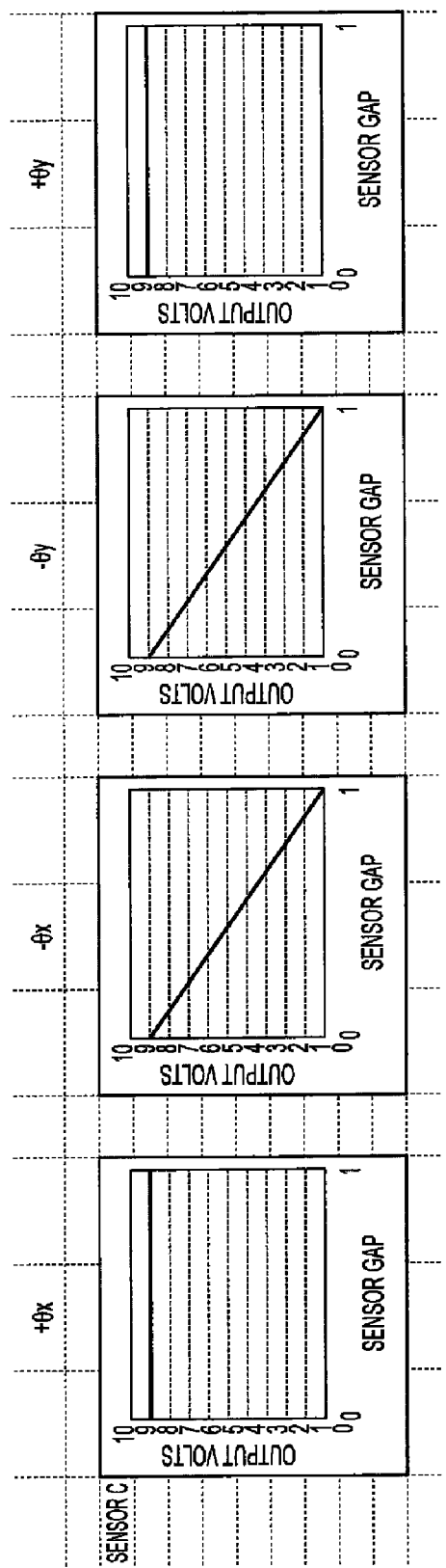
FIG. 13c depicts four plots of output voltages of sensor C resulting from angular rotation about the X and Y axes.
Figure 13D:
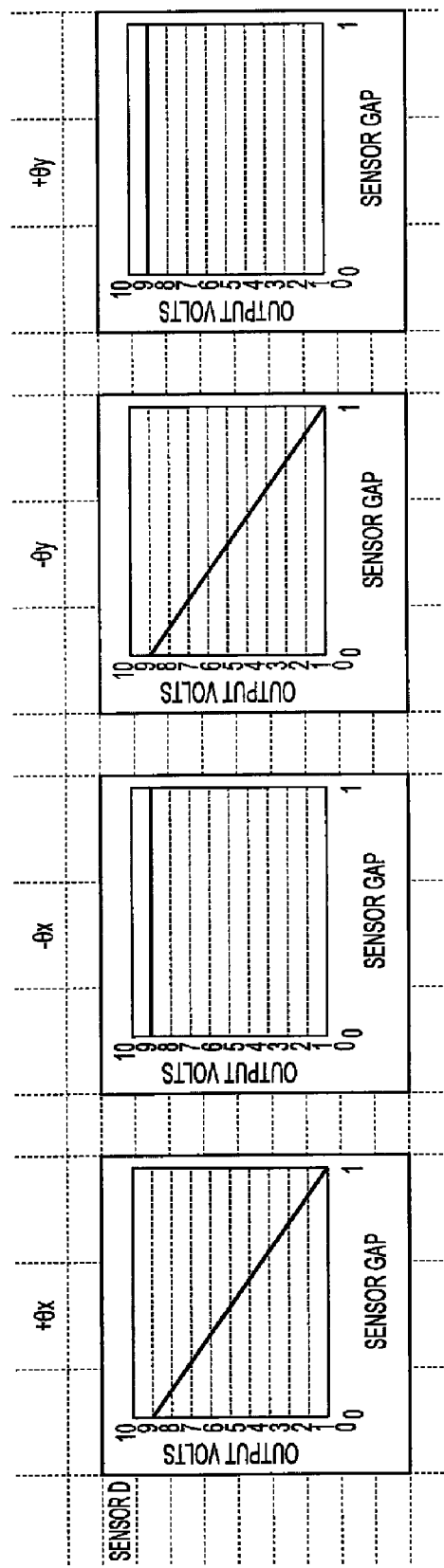
FIG. 13d depicts four plots of output voltages of sensor D resulting from angular rotation about the X and Y axes.

For example, in FIG. 13a, the output voltage of sensor A decreases with $+\theta x$ or $+\theta y$ rotations. This decrease in output voltage is due to the gap between sensor A and drive plate 414 being reduced with $+\theta x$ or $+\theta y$ rotations. Similarly, in FIG. 13b, the output voltage of sensor B decreases with $-\theta x$ or $+\theta y$ rotations. In FIG. 13c the output voltage of sensor C decreases with $-\theta x$ or $-\theta y$ rotations. Also, as shown in FIG. 13d, the output voltage of sensor D decreases with $+\theta x$ or $-\theta y$ rotations.

In one embodiment, the four proximity sensors are operated as two differential pairs for reducing common mode noise. For example, sensor pair (A and C) are positioned 180 degrees with respect to each other and sensor pair (B and D) are also positioned 180 degrees with respect to each other. Each of these sensor pairs are operated differentially (A operates differentially with C) and (B operates differentially with D). A continuous linear voltage proportional to angular position of drive plate assembly 304 may be realized if the output voltages of the two sensor pairs are differentially combined as differential voltages (A-C) and (B-D).

Figure 14A:
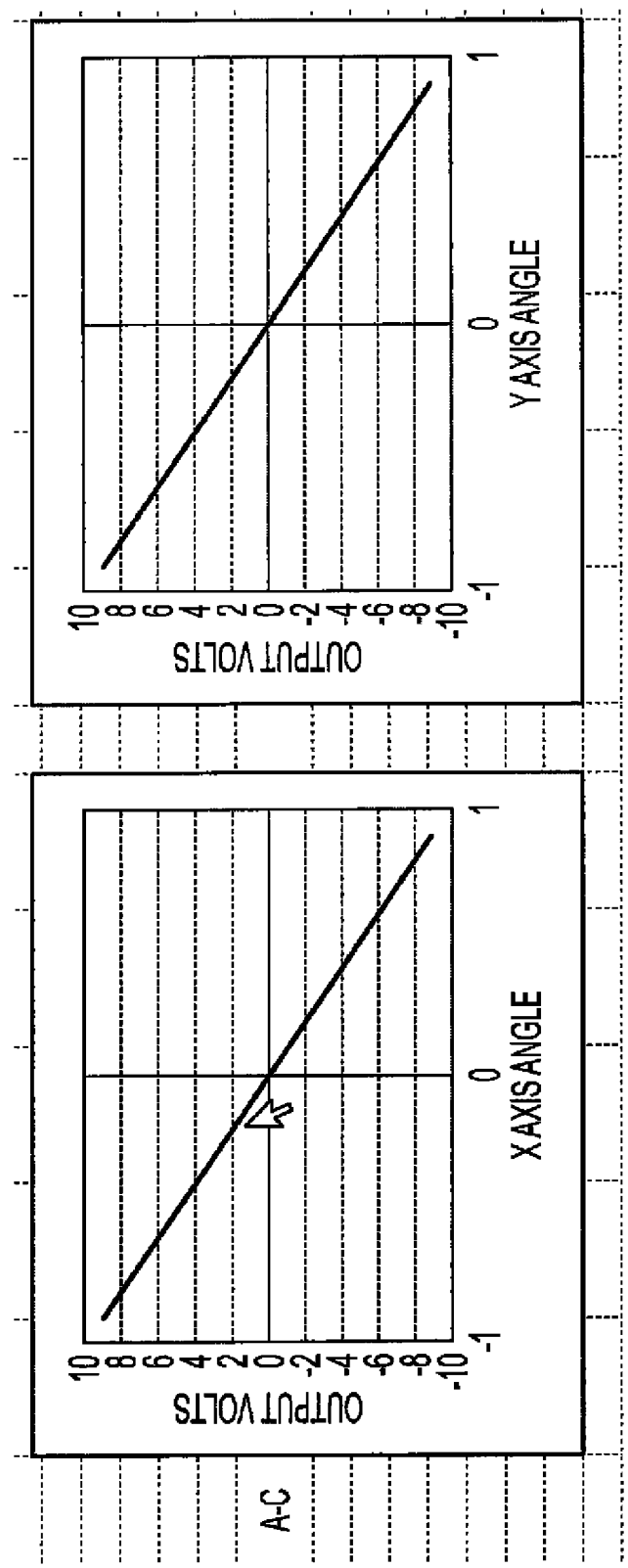
FIG. 14a depicts two plots of differential output voltages between sensors A and C.
Figure 14B:
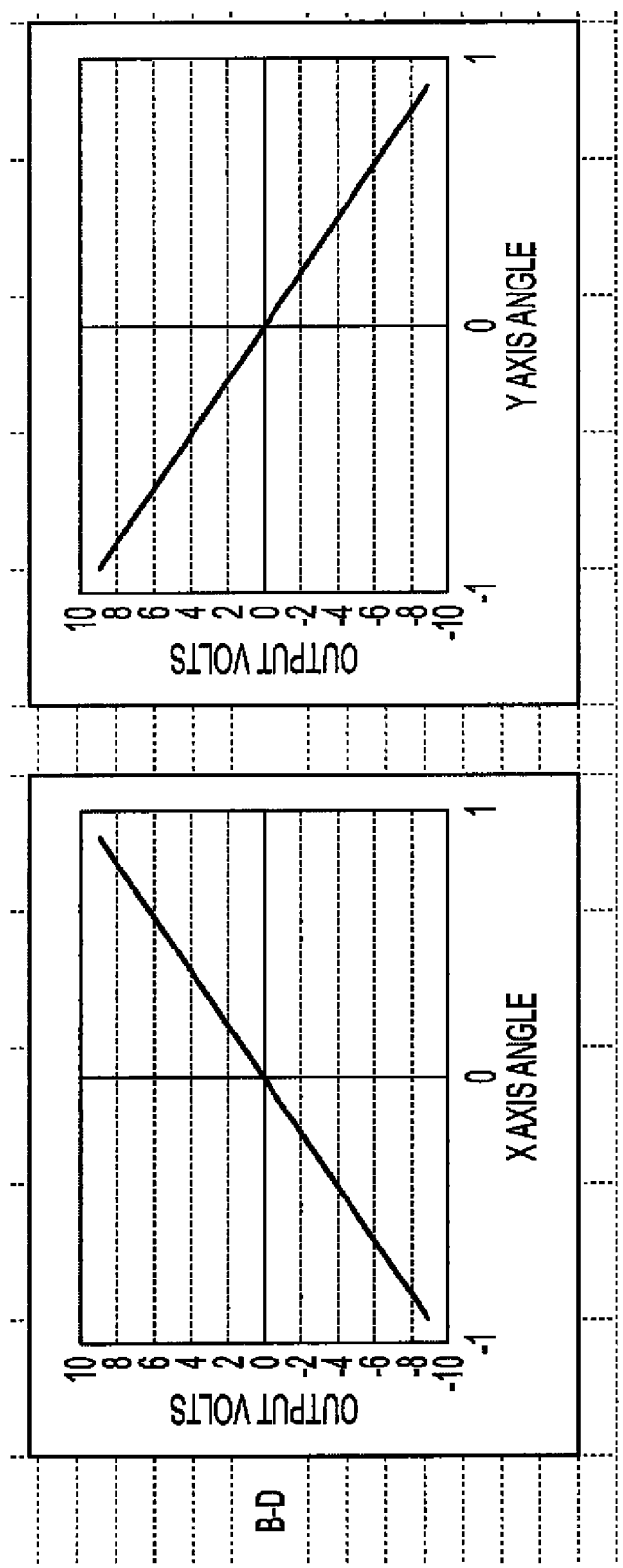
FIG. 14b depicts two plots of differential output voltages between sensors B and D.

The differential output voltages with respect to rotations about the X and Y axes are shown in FIGS. 14a and 14b respectively. In one example, the (A-C) differential voltage decreases linearly as both X and Y axes rotation angles vary from a maximum negative angle to a maximum positive angle. In another example, the (B-D) differential voltage increases linearly as the X axis rotation angle varies from a maximum negative angle to a maximum positive angle, whereas the (B-D) voltage decreases linearly as the Y axis rotation angle varies from the maximum negative angle to the maximum positive angle.

Figure 15A:
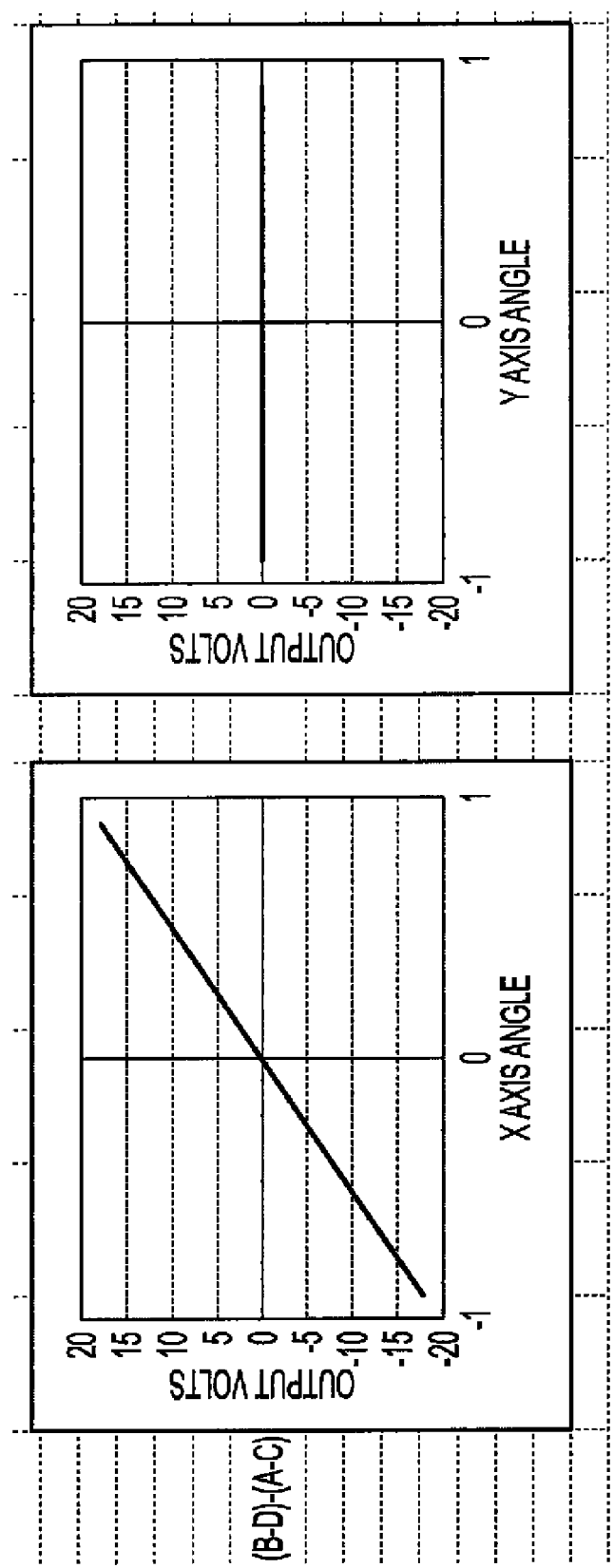
FIG. 15a depicts two plots of summed output voltages between the voltages shown in FIGS. 14a and 14b.
Figure 15B:
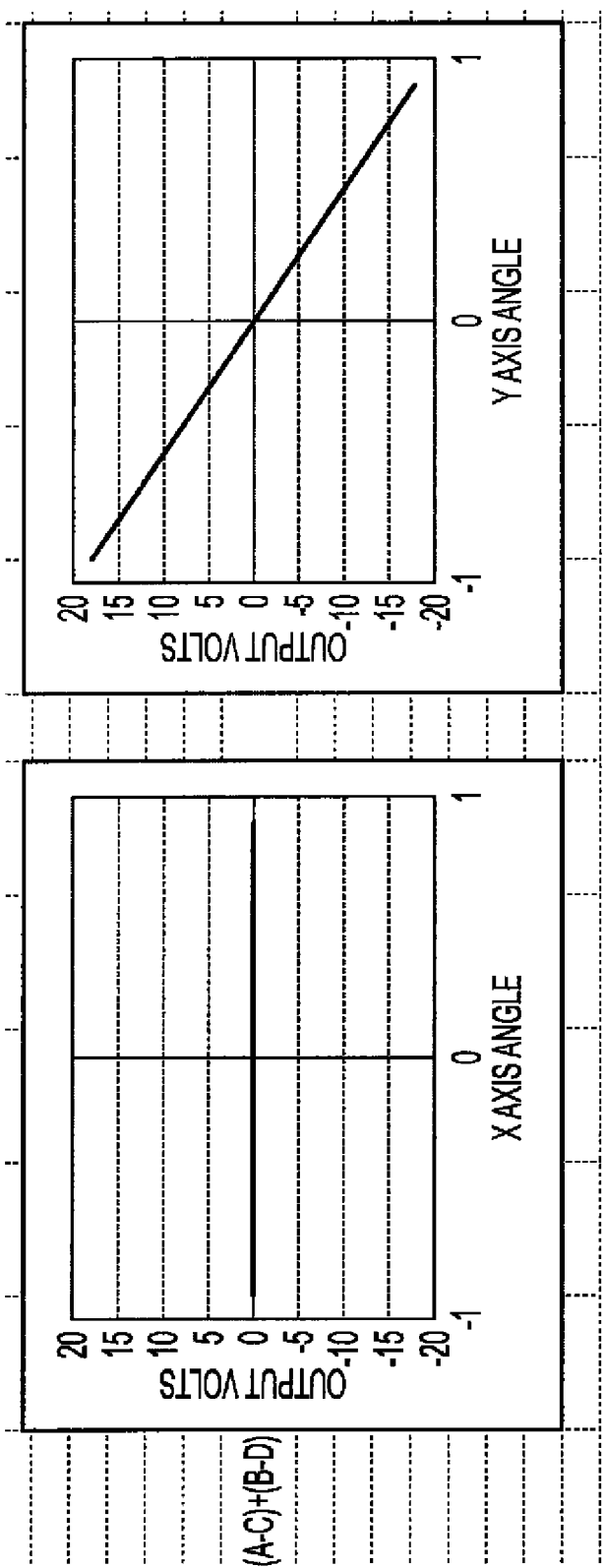
FIG. 15b depicts two plots of differential output voltages between the voltages shown in FIGS. 14a and 14b.

Determining the X and Y position of mirror 104 may be beneficial in performing mirror steering. Therefore, rotations in the X and Y axis are resolved into pure $\theta x$ and $\theta y$ components by computing the sum and differences of the differential output voltages in FIGS. 14a and 14b. Specifically, the (B-D)-(A-C) voltage is proportional to the pure $\theta x$ component, whereas the $-((A-C)+(B-D))$ voltage is proportional to the pure $\theta y$ component. These pure $\theta x$ and $\theta y$ components are shown in FIGS. 15a and 15b respectively. In FIG. 15a, the (B-D)-(A-C) voltage increases linearly as the X axis rotation angle varies from a maximum negative angle to a maximum positive angle. Similarly, in FIG. 15b, the (A-C)+(B-D) voltage decreases linearly as the Y axis rotation angle varies from a maximum negative angle to a maximum positive angle.

Errors in detecting the pure θx and θy components due to cross coupling, dimensional tolerance, and misalignment may also be measured by observing the ((B-D)−(A-C)) and ((A-C)+(B-D)) output voltages. For example, errors in detecting the θx component may be measured by observing (B-D)−(A-C) while rotating in the θy direction and holding θx constant. If the (B-D)−(A-C) voltage remains constant during this test, it is determined that no detection error is present. Similarly, errors in detecting the θy component may be measured by observing the (A-C)+(B-D) output voltage while rotating in the θx direction and holding θy constant. If the (A-C)+(B-D) voltage remains constant during this test, then it is determined that no detection error is present.

The differential sensor mode described in this embodiment, effectively reduces the noise factor in detection by a factor of 1.4 since random noise is averaged. Also, the 45 degree angle positioning of sensors (A-D) effectively decouples θx from θy even though the sensors are not located directly on the X or Y axes. Other sensor locations may be alternatively chosen, however, a transformation matrix is developed to account for differing angular and radial position relative to the center of rotation.

Figure 16:
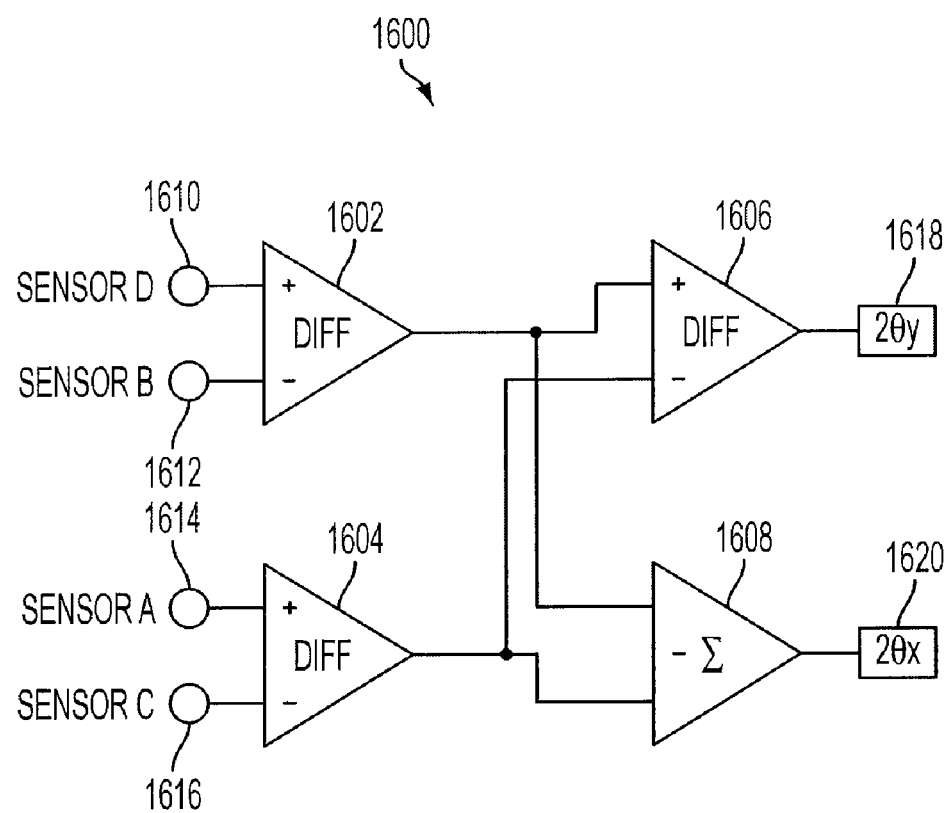
FIG. 16 is a schematic diagram of a circuit for computing the voltages depicted in FIGS. 14a, 14b, 15a and 15b.

Shown in FIG. 16 is a schematic diagram of detection circuit 1600. Circuit 1600 computes the output voltage values shown in FIGS. 15a and 15b which indicate the pure X and Y position of mirror 104. Output voltages 1610, 1612, 1614, and 1616 of sensors (A-D) are input to differential amplifiers 1602 and 1604 respectively. Amplifiers 1602 and 1604 compute the differences between the four sensor output voltages and then input the computed voltage differences to amplifiers 1606 and 1608 respectively. Utilizing the computed voltage differences, amplifiers 1606 and 1608 compute the pure θx and θy components of mirror 104.

In general, differential amplifier 1606 has a high input common mode rejection, and summing amplifier 1608 is an inverting summer combined with an inverting buffer. The configuration of circuit 1600 may alternatively be implemented in software by digitizing the differential input signals and then computing the sum and differences. Furthermore, sample averaging may also be used in both hardware and software configurations to reduce noise.

Figure 17:
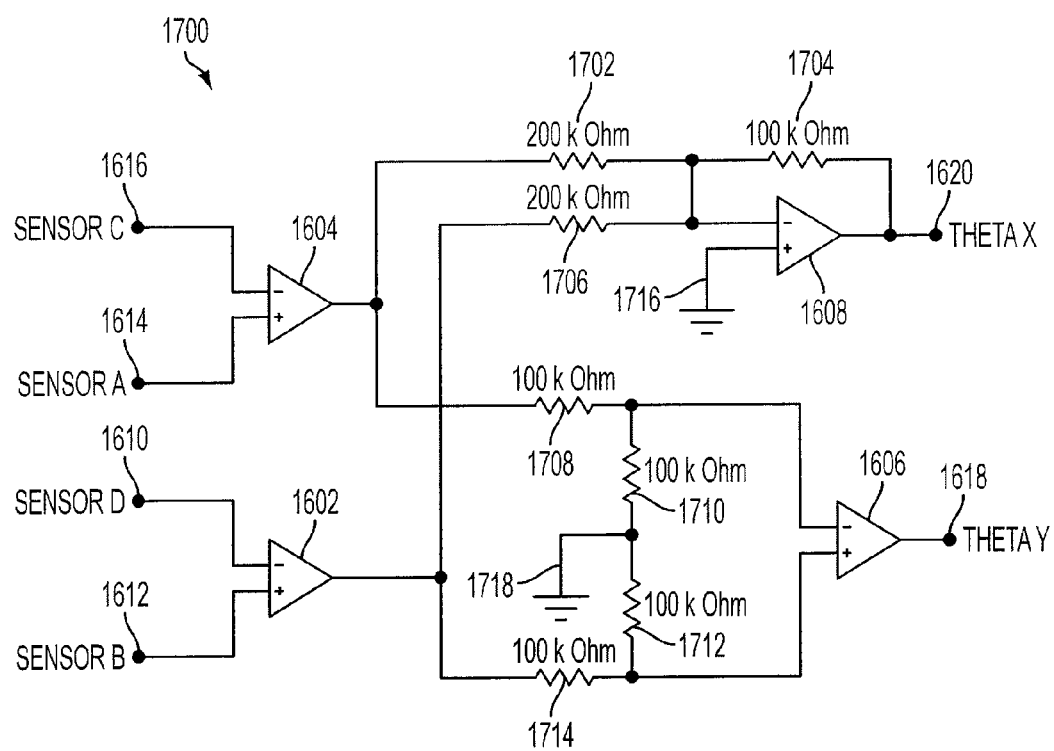
FIG. 17 is a detailed schematic diagram of the circuit shown in FIG. 16.

FIG. 17 is a schematic diagram of circuit 1700 which is a detailed view of detection circuit 1600. Resistors 1702, 1704, 1706, 1708, 1710, 1712 and 1714 are placed at the input terminals of amplifiers 1606 and 1608. The non inverting terminal of amplifier 1608 and the common connection point between resistors 1710 and 1712 are grounded by ground terminals 1716 and 1718 respectively. This configuration provides attenuation of the amplifier input signals by a factor of 2 which compensates for the rail voltages of the amplifiers (rail voltages may double the values of θx and θy).

It should be noted that if an inverted output may be accommodated by the external processing electronics, the differential signals may be reversed at the input and the inverting buffer on the summer amplifier may be eliminated. Elimination of the inverting buffer may reduce noise, power consumption and physical space requirements of the circuit.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. An apparatus for tilting a mirror comprising:
a mirror for reflecting light from an object;
a plate for supporting the mirror; and
a diaphragm sandwiched between the mirror and the plate, the diaphragm including a planar substrate having a center and a circumferential edge surrounding the center, and
the diaphragm including cutout portions forming a pattern in the diaphragm,
wherein the plate provides tilt motion to the mirror, and
the pattern in the diaphragm stabilizes the tilt motion of the mirror, and
the pattern includes a plurality of first cutout portions, each of the first cutout portions defined by at least two first legs originating from a common location proximate to the center and extending toward the circumferential edge, and
a plurality of second cutout portions, each of the second cutout portions defined by at least two second legs originating from a common location proximate to the circumferential edge and extending toward the center.

2. The apparatus of claim 1 wherein
the plurality of first and second cutout portions are arranged symmetrically about the substrate.

3. The apparatus of claim 2 wherein
each of the first cutout portions includes three legs, and
each of the second cutout portions includes two legs.

4. The apparatus of claim 2 wherein
at least one first leg of each of the first cutout portions is disposed between at least two second legs of each of the second cutout portions.

5. The apparatus of claim 2 wherein
the first legs of the plurality of first cutout portions are interlaced with the second legs of the plurality of second cutout portions.

6. The apparatus of claim 1 wherein
the plate forms a top surface oriented in an X, Y plane of an orthogonal X, Y, Z coordinate system, and
the apparatus further comprises:
a plurality of yokes extending from the plate downwardly in a Z direction of the X, Y, Z coordinate system, each of the yokes receiving a coil for forming a magnetic field,
a plurality of pairs of magnets, each pair of magnets oriented to sandwich a respective coil, each pair of magnets and a respective coil defining a push/pull set,
wherein each push/pull set is arranged to push upwardly or downwardly in the Z direction on the plate.

7. The apparatus of claim 6 wherein
the plate is fixed in the Z direction at a central point, and free to rotate in X and Y directions, and
two first push/pull sets are arranged to rotate the plate in the X direction.

8. The apparatus of claim 7 wherein
two second push/pull sets are oriented orthogonally to the two first push/pull sets and arranged to rotate the plate in the Y direction.

9. The apparatus of claim 1 wherein
the pattern in the diaphragm provides a nearly constant stiffness value (expressed in inch-pounds per degree) as a function of different tilt angles (expressed in degrees).

10. The apparatus of claim 1 wherein
the pattern in the diaphragm provides a first slope value obtained from stiffness values as a function of degrees that is smaller than a second slope value of a similar diaphragm without a cutout pattern.

11. An apparatus for sensing angular position of a mirror comprising:
a plate forming an X, Y plane in an X, Y, Z coordinate system for providing angular motion to the mirror about X and Y axes, four proximity sensors oriented equidistantly on a radius from a center point of the plate and sequentially positioned 90 degrees from one another, each proximity sensor located 45 degrees from the X or Y axis, and separated from the plate by a gap in a Z direction, wherein each of the sensors provides a decreasing output voltage when a respective gap to the drive plate decreases, and a constant output voltage when the respective gap to the drive plate increases, and a circuit for receiving the output voltage from each of the sensors and determining the angular position of the mirror.

12. The apparatus of claim 11 wherein the circuit includes a first differential amplifier for receiving the output voltages from two proximity sensors positioned 180 degrees from each other and determining a first difference voltage, a second differential amplifier for receiving the output voltages from the other two proximity sensors and determining a second difference voltage, a third differential amplifier for receiving the first and second difference voltages and determining a third difference voltage, and a summing amplifier for receiving the first and second difference voltages and determining a summed voltage, wherein the angular position of the mirror is determined by the third difference voltage and the summed voltage, respectively, representing angular rotations about the Y axis and X axis.

13. The apparatus of claim 11 including a diaphragm sandwiched between the mirror and the plate, the diaphragm including cutout portions forming a pattern in the diaphragm, wherein the pattern in the diaphragm linearizes the angular motion of the mirror.

14. The apparatus of claim 13 wherein the pattern in the diaphragm is effective in moving the mirror independently about the X axis, and moving the mirror independently about the Y axis.

15. The apparatus of claim 13 wherein the diaphragm includes a planar substrate fixed at the center point, and the pattern includes a plurality of cutout portions arranged symmetrically about the center point in a serpentine pattern.

16. The apparatus of claim 13 wherein the pattern in the diaphragm provides a nearly constant stiffness value (expressed in inch-pounds per degree) as a function of angular change (expressed in degrees).

* * * * *